United States Patent
Ogata et al.

(10) Patent No.: US 7,127,122 B2
(45) Date of Patent: Oct. 24, 2006

(54) IMAGE PROCESSING METHOD AND IMAGE PROCESSING APPARATUS

(75) Inventors: Masami Ogata, Kanagawa (JP); Kazuhiko Ueda, Kanagawa (JP)

(73) Assignee: Sony Corporation, Tokyo (JP)

(*) Notice: Subject to any disclaimer, the term of this patent is extended or adjusted under 35 U.S.C. 154(b) by 777 days.

(21) Appl. No.: 10/362,201

(22) PCT Filed: Jun. 19, 2002

(86) PCT No.: PCT/JP02/06106

§ 371 (c)(1),
(2), (4) Date: Feb. 20, 2003

(87) PCT Pub. No.: WO03/001793

PCT Pub. Date: Jan. 3, 2003

(65) Prior Publication Data

US 2003/0156761 A1   Aug. 21, 2003

(51) Int. Cl.
*G06K 9/40* (2006.01)

(52) U.S. Cl. ............................. 382/260; 382/261

(58) Field of Classification Search ............ 382/260, 382/261, 264, 266
See application file for complete search history.

(56) References Cited

U.S. PATENT DOCUMENTS 6,724,943 B1 * 4/2004 Tsuchiya et al. ............ 382/261

2001/0038716 A1 * 11/2001 Tsuchiya et al. ............ 382/261

FOREIGN PATENT DOCUMENTS

| JP | 62-155679 | 7/1987 |
| JP | 07-212759 | 8/1995 |
| JP | 08-65673  | 3/1996 |
| JP | 09-247674 | 9/1997 |

\* cited by examiner

*Primary Examiner*—Sanjiv Shah
(74) *Attorney, Agent, or Firm*—Sonnenschein Nath & Rosenthal LLP

(57) ABSTRACT

By the use of an epsilon filter, in the case where a plurality of different illuminations exist, a boundary between the illuminations can be appropriately extracted, and an unnatural image pattern can be prevented from being generated, therefore subjectively preferable compression of a dynamic range can be achieved. An edge strength G(x, y) is calculated per position on an input image, and a threshold E(x, y) of an epsilon filter (12) is controlled on the basis of the edge strength G(x, y). The epsilon filter (12) filters the input image on the basis of the controlled threshold E(x, y). On the basis of the edge strength G(x, y), the threshold E of the epsilon filter (12) is adaptively changed according to a local gradient of a pixel value I(x, y), so in the case of using a linear lowpass filter or a fixed threshold epsilon filter, an illumination boundary can be more accurately extracted.

16 Claims, 18 Drawing Sheets

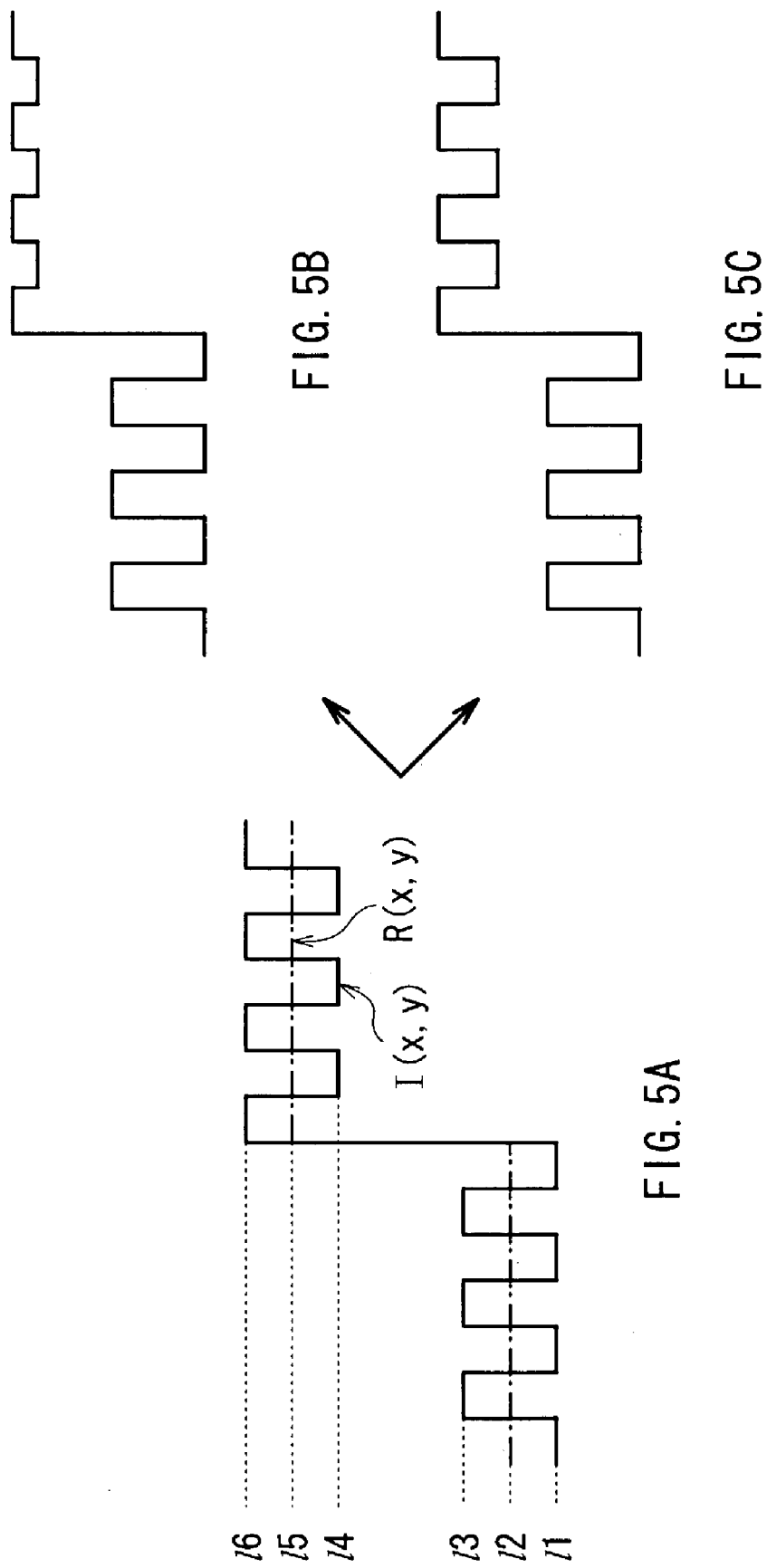

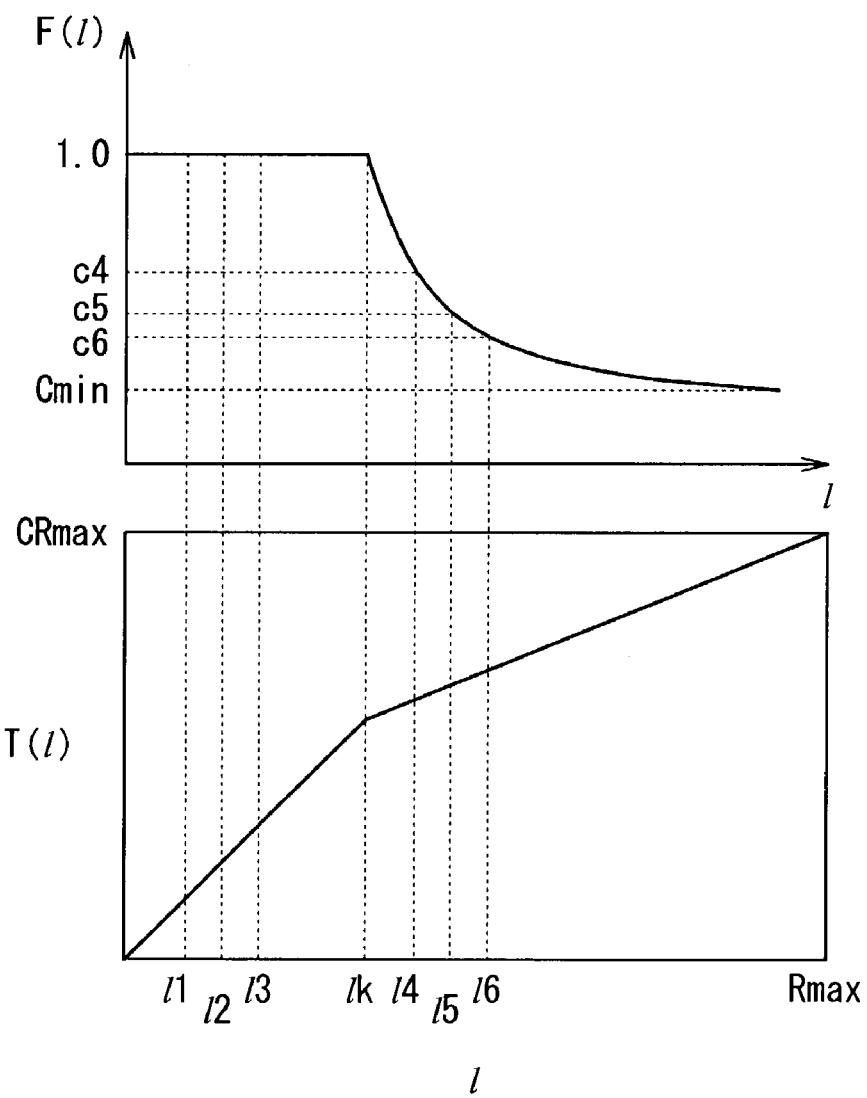

FIG. 9A
INPUT SIGNAL
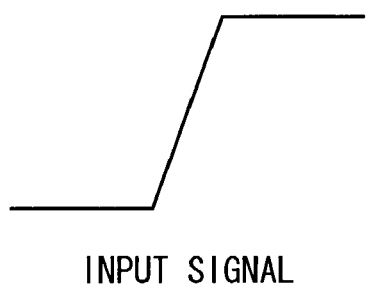
FIG. 9B
OUTPUT SIGNAL
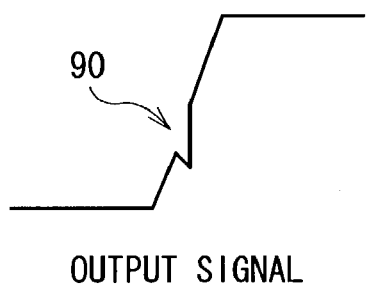
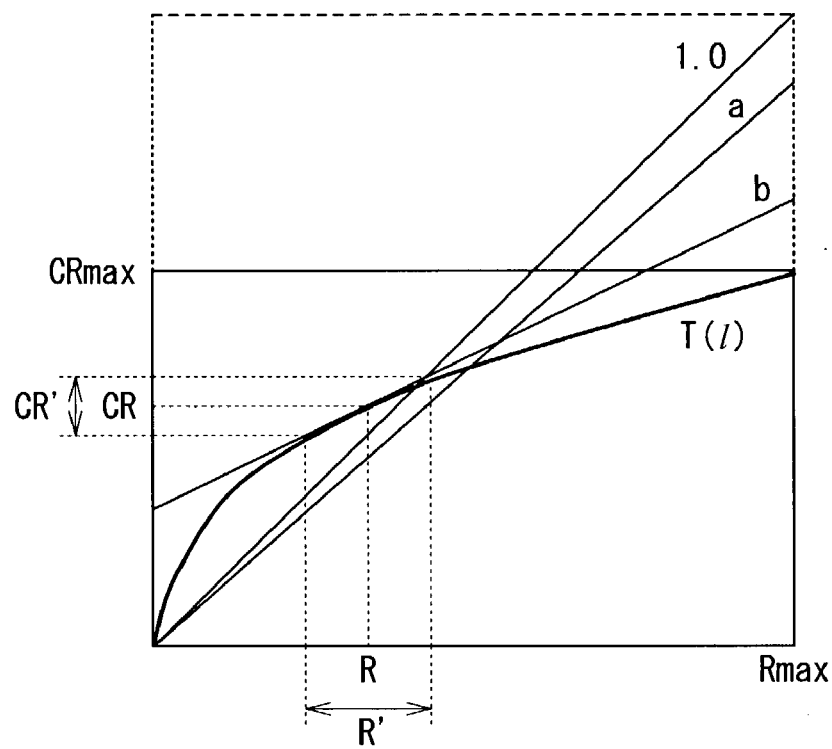
FIG. 10 a > b a < b

IMAGE PROCESSING METHOD AND IMAGE PROCESSING APPARATUS

TECHNICAL FIELD

The present invention relates to an image processing method and an image processing apparatus suitably applicable to various image input/output devices such as televisions, video tape recorders, still cameras, video cameras and printers, and more specifically to an image processing method and an image processing apparatus for reproducing an inputted image in an imaging device with a relatively narrow dynamic range.

BACKGROUND ART

As a conventional method, there is a method (hereinafter referred to as "level conversion") of converting each pixel of an input image by a function having an input/output relationship (hereinafter referred to as "level conversion function") indicated by a solid line in FIG. 18, for example, for conversion of gradation characteristics of an image. In FIG. 18, a lateral axis indicates a pixel level (input level) l of an input image, and a vertical axis indicates a pixel level (output level) T(l) of an output image by the level conversion. Lmax indicates a maximum level which each pixel of an input/output image can obtain. A contrast of the image after the level conversion increases with an increase in a gradient of the level conversion function. In an example shown in FIG. 18, gradients of straight lines indicating the level conversion function in a high level from an input level lb as a border of the high level and in a low level from an input level ls as a border of the low level are smaller than a gradient in a medium level (from the input level ls to the input level lb). Therefore, in the level conversion using the function shown in FIG. 18, a contrast in the medium level is increased by sacrificing contrasts in the high level and the low level.

In addition to the level conversion function shown in FIG. 18, a level conversion function indicated by a solid line in FIG. 19 can be used. In the level conversion function shown in FIG. 19, a gradient of a straight line in the high level from an input level lk as a boundary of the high level is smaller than gradients in the low level and the medium level. Therefore, in the level conversion using the function shown in FIG. 19, the contrasts in the low level and the medium level can be increased by sacrificing the contrast in the high level. Further, compared with the functions shown in FIGS. 18 and 19, a more continuous level conversion function such as a gamma function shown in Mathematical Formula 1 or a LOG function shown in Mathematical Formula 2 may be used. In Mathematical Formula 1, "g" indicates a parameter for adjusting the gradient of the function.

Moreover, as another conventional method, there is a method of adaptively changing the level conversion function according to a frequency distribution of the pixel level of the input image, and as a typical example of the conventional method, a method called histogram equalization is cited. FIGS. 20A and 20B show a principle of the histogram equalization. In FIG. 20A, a lateral axis indicates a pixel level (input level) l of an input image, and a vertical axis indicates frequency (or cumulative frequency). Fmax indicates a maximum value of the cumulative frequency, which is a total number of pixels used for calculating the frequency. In the method, as shown in FIG. 20A, at first a frequency distribution H(l) relating to the pixel level l of the input image is produced, and then a cumulative frequency distribution C(l) is produced by the use of Mathematical Formula 3.

The vertical axis of the cumulative frequency distribution C(l) is normalized to a level range in which the output image can obtain by the use of Mathematical Formula 4 so as to produce a level conversion function T(l) (refer to FIG. 20B). By the use of the function T(l), a contrast in a region configured with a high frequency level (a region with a large area) can be increased.

When an inputted image is used in an environment where the dynamic range is smaller, that is, the number of bits representing the pixel level is smaller (for example, in the case of transmitting the image through a transmission line with a small number of bits, displaying the image on a display apparatus, or storing the image in memory), the dynamic range is required to be compressed. Conventionally, the same level conversion as the method described above is used to compress the dynamic range for such purpose. However, in this case, a maximum level of the output image of the level conversion function has a smaller value than that of the input image.

On the other hand, in literature of "Z. Rahman, et, alt.:"A Multiscale retinex for color rendition and dynamic range compression in Applications of Digital image Processing", XIX Proc. SPIE 2847 (1996)", a method (hereinafter referred to as "Multiscale retinex method") of compressing the entire dynamic range by extracting and compressing a component of illumination light which is spatially and slightly changed by the use of a lowpass filter is proposed. A linear narrow-band lowpass filter is used to extract an illumination component. In the method, as shown in Mathematical Formula 5, a logarithm value of an input pixel value I(x, y) and a logarithm value of a lowpass filter output LPF(I(x, y)) are taken, and then the latter is subtracted from the former to compress the dynamic range.

In the above conventional level conversion methods, in order to prevent from producing an unnatural image, a level conversion function having a monotone increasing property is used. Therefore, there is a problem that when a contrast in any level range (the gradient of the level conversion function) is increased, conversely, contrasts in other level ranges declines.

Further, in the Multiscale retinex method, by sacrificing the monotone increasing property, an image with a higher contrast can be reproduced. However, there is a problem that when an illumination condition is suddenly switched, the linear filter cannot extract a change in the illumination condition, so a subjectively undesirable noise occurs.

For example, as shown in FIG. 21, when an image having two regions with different illumination conditions adjacent to each other (indicated by a solid line in the drawing) is filtered by the linear lowpass filter, a signal with an ambiguous boundary indicated by a thin broken line is obtained as a filter output. When the filter output is considered as the illumination component, in a region on a left side of an illumination boundary (B region), a portion near the boundary (BNB region) has a lower illumination level than a portion at a distance from the boundary (BFB region). The Mathematical Formula 5 is equivalent to dividing an input signal by the illumination component, and means that the larger the illumination component is, the more the input signal is compressed. Accordingly, overshoot occurs in the BNB region of a reproduced image (indicated by a thick broken line in the drawing). Conversely, it is considered that in a region on a right side of the illumination boundary (D region), a portion near the boundary (DNB region) has a higher illumination level than a portion at a distance from the boundary (DFB region), so undershoot occurs. In the Multiscale retinex method, in order to overcome the problem, a method of using a plurality of linear lowpass filters with different scales, and synthesizing results obtained by each of the lowpass filters by a linear load is used, but a weight for each scale is fixed, so the above problem cannot be sufficiently prevented.

Therefore, it is considered that a nonlinear filter such as, for example, an epsilon filter instead of the linear lowpass filter is used to extract the illumination component. The epsilon filter is superior in performance of storing an edge to the linear filter, so the illumination component can be effectively extracted from an image where different illumination lights exist. However, in a fixed threshold epsilon filter which is generally used to remove noise, a discontinuous waveform is generated in an output thereof in a neighborhood of the edge, so when the filter is used to compress the dynamic range, an unnatural image pattern which does not exist in an original image may be generated in a reproduced image after compression.

In view of the foregoing, it is an object of the invention to provide an image processing method and an image processing apparatus capable of appropriately extracting a boundary between a plurality of illuminations by the use of the epsilon filter in the case where the plurality of illuminations exist, and preventing from generating an unnatural image pattern so as to achieve subjectively preferable compression of the dynamic range.

DISCLOSURE OF THE INVENTION

An image processing method according to the invention comprises the steps of: calculating an edge strength per position on an input image; controlling a threshold of an epsilon filter on the basis of the calculated edge strength; filtering the input image by the epsilon filter by use of the threshold controlled in the step of controlling the threshold; and calculating a coefficient for converting a pixel value according to an output value in the step of filtering, and converting the pixel value per pixel by the calculated coefficient.

An image processing apparatus according to the invention comprises: an edge strength calculating means for calculating an edge strength per position on an input image; an epsilon filter for filtering the input image by use of a predetermined threshold; a threshold control means for controlling the threshold used in the epsilon filter on the basis of the edge strength calculated by the edge strength calculating means; and a pixel value conversion means for calculating a coefficient for converting a pixel value according to an output value from the epsilon filter and converting the pixel value per pixel by the calculated coefficient.

In the image processing method and the image processing apparatus according to the invention, the edge strength is calculated per position on the input image, and the threshold used in the epsilon filter is controlled on the basis of the calculated edge strength. Then, a coefficient for converting a pixel value is calculated according to an output value from the epsilon filter, and the pixel value is converted per pixel by the calculated coefficient. Thereby, in the case where a plurality of different illuminations exit, in filtering by the epsilon filter, a boundary between the illuminations can be appropriately extracted.

In the invention, for example, the threshold of the epsilon filter is controlled so that the larger the edge strength is, the smaller a value of the threshold becomes. In this case, the threshold of the epsilon filter may be further controlled so that the larger a pixel value of the input image is, the larger the threshold becomes. Thereby, in filtering by the epsilon filter, an influence of an illumination level on a change in the pixel value can be reduced, so an illumination component can be appropriately extracted.

Moreover, two thresholds with different values may be calculated so as to control the threshold. In this case, in the epsilon filter, for example, filtering is performed by the use of a different threshold depending upon whether a value of a neighboring pixel is larger or smaller than a value of a pixel of interest. Thereby, in filtering, an influence of the illumination level on a change in the pixel value can be reduced, so the illumination component can be more appropriately extracted.

BRIEF DESCRIPTION OF THE DRAWINGS

FIGS. 5A through 5C are illustrations for explaining a difference between a reproduced image by a conventional method and a reproduced image by the image processing apparatus shown in FIG. 1;

FIGS. 6A and 6B are illustrations for explaining a relationship between the level conversion function and a coefficient calculation function;

FIGS. 9A and 9B are illustrations for explaining an inversion phenomenon of a level gradient which occurs in the fixed threshold epsilon filter;

FIG. 10 is an illustration for explaining a relationship between the level conversion function used for an output of the epsilon filter and a differential value thereof;

BEST MODE FOR CARRYING OUT THE INVENTION

Preferred embodiments of the present invention will be described in more detail below referring to the accompanying drawings.

[First Embodiment]

Figure 2:
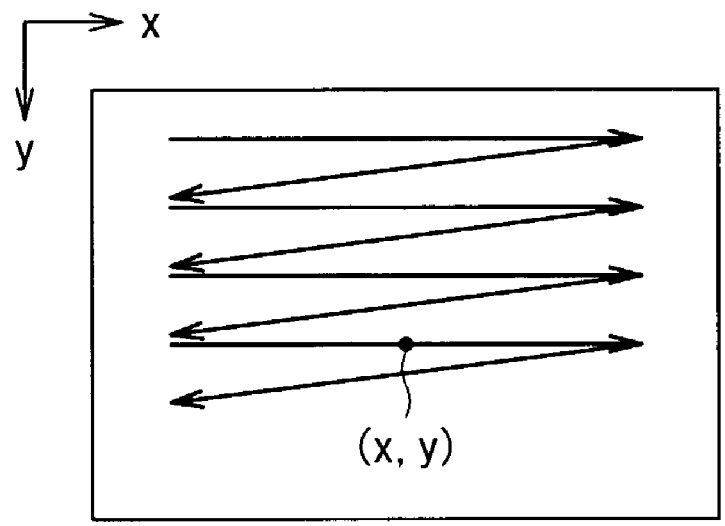
FIG. 2 is an illustration for explaining a scanning direction of an image.

At first, an input image signal which is processed in an image processing apparatus according to a first embodiment of the invention will be described below. The input image signal processed in the image processing apparatus is a signal of a time-series pixel value obtained by scanning a two-dimensional digital image in a horizontal direction and a vertical direction in this order as shown in FIG. 2. In the embodiment, the pixel value corresponding to any position $(x, y)$ on the two-dimensional image indicates $I(x, y)$, and the pixel value is processed as an input image signal.

Figure 1:
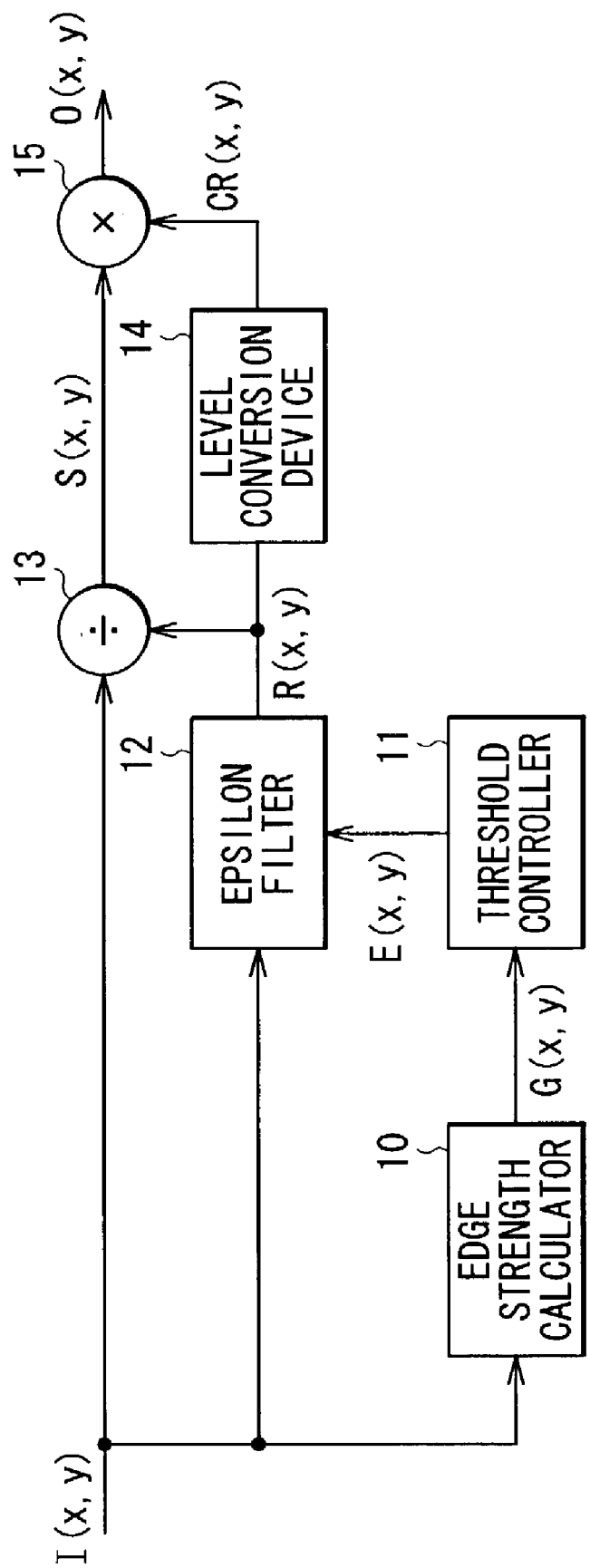
FIG. 1 is a block diagram showing a structure of an image processing apparatus according to a first embodiment of the invention.

Next, a structure of the image processing apparatus according to the embodiment will be described below. As shown in FIG. 1, the image processing apparatus comprises an edge strength calculator 10, a threshold controller 11, an epsilon filter 12, a divider 13, a level conversion device 14 and a multiplier 15.

The edge strength calculator 10 has a function of calculating an edge strength $G(x, y)$ of the pixel value $I(x, y)$ in each position on the input image. As the edge strength $G(x, y)$, a primary differential value of $I(x, y)$ given by, for example, Mathematical Formula 6 can be used.

Alternatively, a value by Mathematical Formula 7 having a smoothing effect for reducing an influence of noise can be used as the edge strength $G(x, y)$.

In Mathematical Formulas 6 and 7, "d" is a constant indicating an infinitesimal distance for calculating a differential. The edge strength $G(x, y)$ calculated by the edge strength calculator 10 is transmitted to the threshold controller 11.

The threshold controller 11 has a function of determining the magnitude of a threshold $E(x, y)$, which is used in the epsilon filter 12 to be described later, per pixel on the basis of the edge strength $G(x, y)$ calculated by the edge strength calculator 10. By the function of the threshold controller 11, the threshold $E(x, y)$ is controlled by the use of, for example, Mathematical Formula 8 so that the larger the edge strength $G(x, y)$ is, the smaller value the threshold $E(x, y)$ becomes.

In Mathematical Formula 8, Gmin, Gmax, Emin and Emax are constants for converting the edge strength $G(x, y)$ into the threshold $E(x, y)$, and indicate a minimum value of the edge strength, a maximum value of the edge strength, a minimum value of the threshold $E(x, y)$ and a maximum value of the threshold $E(x, y)$, respectively. The threshold $E(x, y)$ determined by the threshold controller 11 is transmitted to the epsilon filter 12.

Figure 4:
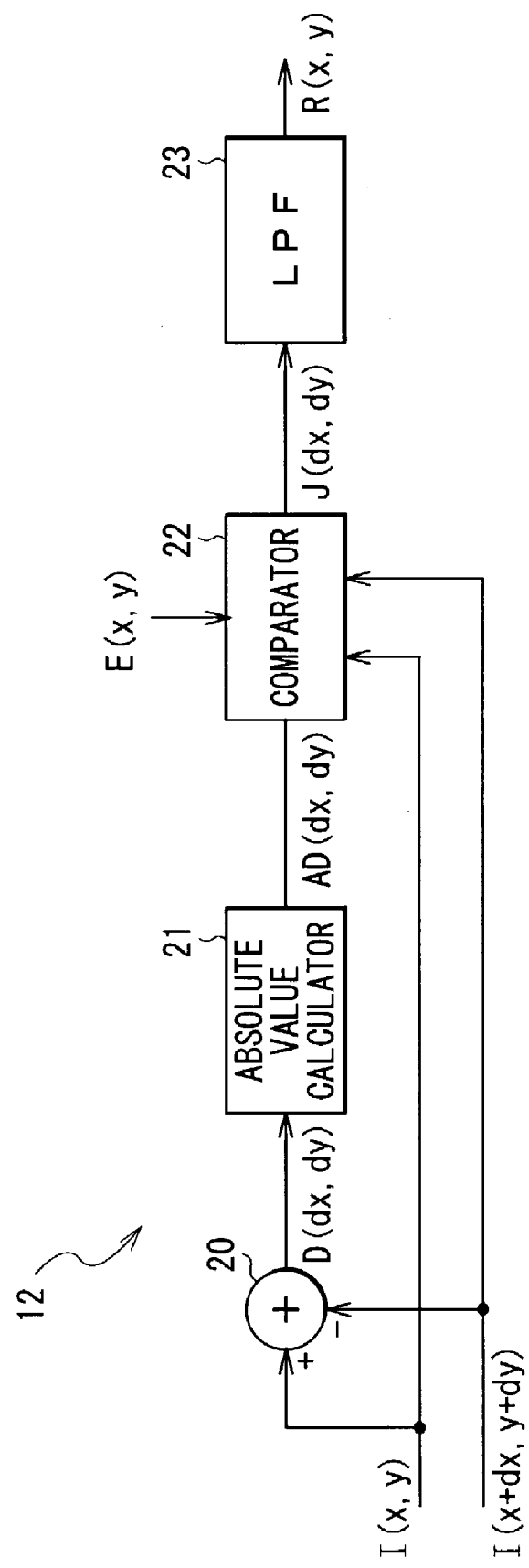
FIG. 4 is a block diagram showing a structure of an epsilon filter in the image processing apparatus shown in FIG. 1.

As shown in FIG. 4, the epsilon filter 12 includes, for example, a difference device 20, an absolute value calculator 21, a comparator 22 and a linear lowpass filter (LPF in the drawing) 23. The epsilon filter 12 is a two-dimensional filter, and has a function of nonlinearly filtering the input image by the use of the threshold $E(x, y)$ determined by the threshold controller 11. An output $R(x, y)$ of the epsilon filter 12 is transmitted to the divider 13 and the level conversion device 14 as an illumination component.

In order to remove the illumination component calculated by the epsilon filter 12 from the input image, as shown in Mathematical Formula 9, the divider 13 performs a division of each pixel value $I(x, y)$ of the input image by the illumination component $R(x, y)$. A non-illumination component $S(x, y)$ obtained as a result of the division is transmitted to the multiplier 15.

The level conversion device 14 has a function of performing level conversion on the illumination component $R(x, y)$ calculated by the epsilon filter 12 by a level conversion function $T(l)$ as shown in Mathematical Formula 10 to compress the illumination component $R(x, y)$, and thereby calculating a correction illumination component $CR(x, y)$.

Figure 3:
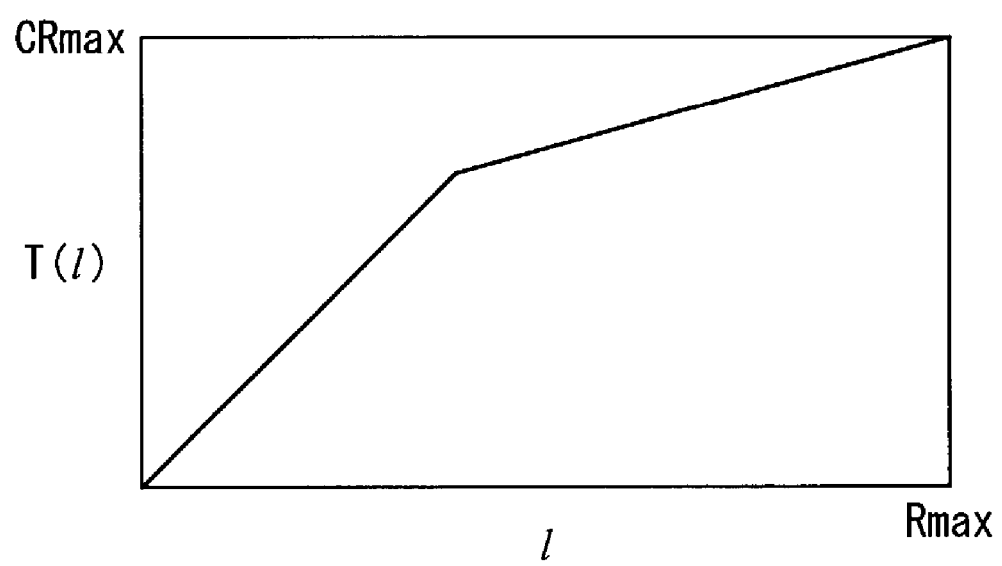
FIG. 3 is an illustration for explaining an example of a level conversion function.

As the level conversion function $T(l)$ used in the level conversion device 14, for example, a function shown in FIG. 3 can be used. In FIG. 3, Rmax and CRmax indicate maximum values of an input level and an output level, respectively.

The multiplier 15 multiplies the non-illumination component $S(x, y)$ by the correction illumination component $CR(x, y)$ as shown in Mathematical Formula 11 to reproduce the image signal. An image signal $O(x, y)$ indicating a reproduced result is outputted to a transmission line, memory, a display apparatus or the like (all not shown).

In the embodiment, the divider 13, the level conversion device 14 and the multiplier 15 correspond to a specific example of "a pixel value conversion means" in the invention.

Next, effects and actions of the image processing apparatus with the above structure will be described below. The description below includes a description of an image processing method according to the embodiment.

In the image processing apparatus, a signal indicating the input image is inputted into the edge strength calculator 10, the epsilon filter 12 and the multiplier 13. At first, in the edge strength calculator 10, the magnitude of the edge, that is, the edge strength G(x, y) per position on the input image is calculated. At this time, the edge strength calculator 10 calculates the edge strength G(x, Y) by the use of, for example, Mathematical Formula 6 or 7 so that the larger a primary differential value of a pixel value in a neighboring region of a pixel of interest is, the larger the edge strength G(x, y) becomes. The edge strength calculator 10 outputs the calculated edge strength G(x, y) to the threshold controller 11.

The threshold controller 11 controls a threshold E of the epsilon filter 12 on the basis of the edge strength G(x, y). More specifically, the threshold controller 11 determines the magnitude of the threshold E(x, y) per pixel by the use of, for example, Mathematical Formula 8 to control the threshold E(x, y) so that the larger the edge strength G(x, y) is, the smaller the threshold E(x, y) becomes. The threshold controller 11 outputs the determined threshold E(x, y) to the epsilon filter 12.

The epsilon filter 12 filters the input image by the use of the threshold E(x, y) determined by the threshold controller 11.

More specifically, filtering in the epsilon filter 12 is performed by, for example, the structure shown in FIG. 4 as follows. In the epsilon filter 12, as shown in FIG. 4, a signal indicating a value I(x, y) of a pixel of current interest and a signal indicating a value I(x+dx, y+dy) of a pixel in a neighboring region NB of the pixel of current interest are inputted into the difference device 20. The difference device 20 calculates a difference between the value I(x, y) of the pixel of interest and the value I(x+dx, y+dy) of the pixel in the neighboring region NB. The difference device 20 successively calculates difference values between the value I(x, y) of the pixel of interest and values of all pixels in the neighboring region NB, and assigns a difference value D(dx, dy) to each neighboring pixel to output the value D(dx, dy) to the absolute value calculator 21.

The absolute value calculator 21 calculates an absolute value AD(dx, dy) of each difference value D(dx, dy) transmitted from the difference device 20. The absolute value calculator 21 outputs the absolute value AD(dx, dy) to the comparator 22.

The absolute value AD(dx, dy) calculated in the absolute value calculator 21 as well as the signal indicating the value I(x, y) of the pixel of interest, the signal indicating the value I(x+dx, y+dy) of the pixel in the neighboring region NB and the threshold E(x, y) determined by the threshold controller 11 are inputted into the comparator 22. The comparator 22 performs a comparison between the absolute value AD(dx, dy) and the threshold E(x, y) as shown in Mathematical Formula 12, and selects either the value I(x, y) of the pixel of interest or the value I(x+dx, y+dy) of the neighboring pixel according to the result of the comparison to output the selected value as a value J(dx, dy) to the linear lowpass filter 23.

The linear lowpass filter 23 calculates a weighted average value R(x, y) by Mathematical Formula 13 when the value J(dx, dy) corresponding to all pixels in the neighboring region NB is calculated by the comparator 22.

Herein, NB indicates a set of relative coordinates defining a neighboring region in filtering. Further, a(dx, dy) indicates a weighting coefficient for each pixel value. As the linear lowpass filter 23, an average filter shown in, for example, Mathematical Formula 14 can be used.

In Mathematical Formula 14, N indicates a number of pixels in the neighboring region NB. The purpose of the epsilon filter 12 is to remove a fine structure in the image and extracts a massed region, so a large neighboring region is preferable.

As described above, the value R(x, y) obtained in the epsilon filter 12 is considered as a value approximately indicating the illumination component included in the image. The epsilon filter 12 outputs the value R(x, y) as the illumination component to the divider 13 and the level conversion device 14.

The divider 13 divides each pixel value I(x, y) of the input image by the illumination component R(x, y) as shown in Mathematical Formula 9 so as to remove the illumination component calculated by the epsilon filter 12 from the input image and output a non-illumination component S(x, y) obtained as a result to the multiplier 15.

On the other hand, the level conversion device 14 compresses the illumination component R(x, y) calculated by the epsilon filter 12 through level conversion with, for example, the level conversion function T(l) shown in FIG. 3 so as to calculate a correction illumination component CR(x, y). The level conversion device 14 outputs the calculated correction illumination component CR(x, y) to the multiplier 15.

The multiplier 15 multiples the non-illumination component S(x, y) outputted from the divider 13 by the correction illumination component CR(x, y) outputted from the level conversion device 14 to reproduce the image signal. Herein, when the whole computation by the divider 13, the level conversion device 14 and the multiplier 15 is considered, as shown in Mathematical Formula 16, a multiplication of the non-illumination component S(x, y) by the correction illumination component CR(x, y) corresponds to calculating a coefficient F(R(x, y)) for converting the pixel value according to the output value R(x, y) from the epsilon filter 12, and then multiplying the coefficient F(R(x, y)) by the corresponding input pixel value I(x, y) so as to compress the dynamic range by conversion of the pixel value per pixel.

As described above, the image signal O(x, y) outputted from the multiplier 15 is used in an imaging device with relatively narrower dynamic range than the input image, that is, in an environment of a small number of bits indicating the pixel level (in the case of transmitting through a transmission line with a small number of bits, the case of displaying on a display device or the case of storing in memory).

Next, referring to FIGS. 5A through 6B, effectiveness of the case where the dynamic range is compressed by the epsilon filter 12 according to the embodiment against a conventional method (the case where compression is performed by the use of the level conversion function with a monotone increasing property) will be described below.

FIG. 5A is an illustration showing the pixel value I(x, y) of the input image and the output R(x, y) from the epsilon filter 12 according to the embodiment as one-dimensional signals. FIG. 5B shows a result (a reproduced image) of compressing the dynamic range of the input image shown in FIG. 5A by a conventional level conversion method, and FIG. 5C shows a result of compressing the dynamic range according to the embodiment.

Moreover, FIGS. 6A and 6B show a relationship among a pixel level in each region, the level conversion function T(l) and a coefficient calculation function F(l). Herein, the coefficient calculation function F(l) is defined as Mathematical Formula 15 by the use of the level conversion function T(l).

By consideration of Mathematical Formulas 9 and 10 using the coefficient calculation function F(l), Mathematical Formula 11 giving the output image O(x, y) can be rewritten to Mathematical Formula 16.

The Mathematical Formula 16 shows that the compression of the dynamic range by compression of the illumination component R(x, y) can be achieved by multiplying the coefficient F(R(x, y)) calculated per pixel by the corresponding input pixel value I(x, y). In this case, the coefficient calculation function F(l) has a function of converting the output value of the epsilon filter 12 into a gain coefficient applied to each pixel. Further, a minimum value Cmin of the coefficient calculation function F(l) in FIG. 6B is given by Mathematical Formula 17.

As can be seen from FIG. 5B, in the conventional method, a contrast in a low level region (a region consisting of a level l1 and a level l3 shown in FIG. 5A) can be stored, but a contrast in a high level region (a region consisting of a level l4 and a level l6) declines. It is a result of directly receiving an influence of the gradient of the level conversion function T(l) on a high level of an inflection point 1k or over. In the conventional method, in order to improve the contrast, it is required to increase the gradient of the level conversion function T(l).

On the other hand, in the embodiment (refer to FIG. 5C), a single correction coefficient given by the coefficient calculation function F(l) is applied to each of the high level region and the low level region, so the contrast in each region depends upon the magnitude of the correction coefficient. In the embodiment, the correction coefficient determined by an average level l2 is uniformly applied to the low level region, but the value of the correction coefficient is the same 1.0 as that applied to the level l1 and the level l3, so the same level of the contrast as that in the conventional method can be obtained. Moreover, a fixed correction coefficient c5 determined by an average value l5 is applied to the high level region, so the contrast between a portion of the level l4 and a portion of the level l6 can be improved.

In reality, when a direct line corresponding to a level of the inflection point 1k or over is indicated by Mathematical Formula 18 by the use of the level conversion function T(l) consisting of two direct lines with different gradients as shown in FIG. 6A, the contrast in the high level region in the conventional method depends upon a gradient a of the direct line, and is given by "a(l6−l4)/(a*l5+b)=(l6−l4)/(l5+b/a)". Herein, the contrast is defined by (maximum level minimum level)/average level.

On the other hand, the correction coefficient c5 applied to the high level region in the embodiment is given by Mathematical Formula 19.

Therefore, in the embodiment, the contract in the region is c5 (l6−l4)/c5*l5=(l6−l4)/l5, but the gradient of the level conversion function T(l) in compression of the dynamic range in the high level is generally less than 1.0, so an intercept b is always a positive value. This indicates that compared with the conventional method, a method using the epsilon filter 12 according to the embodiment can achieve a higher contrast.

Thus, in the embodiment, a contrast in a region extracted by the epsilon filter 12 is determined by the value of the correction coefficient given by the coefficient calculation function F(l), so the gradient of the level conversion function T(l) has an influence on a contract between regions. Therefore, according to the embodiment, compression of the contract between the regions allows storing the contrast in the region, thereby subjectively preferable output image can be obtained.

Figure 21:
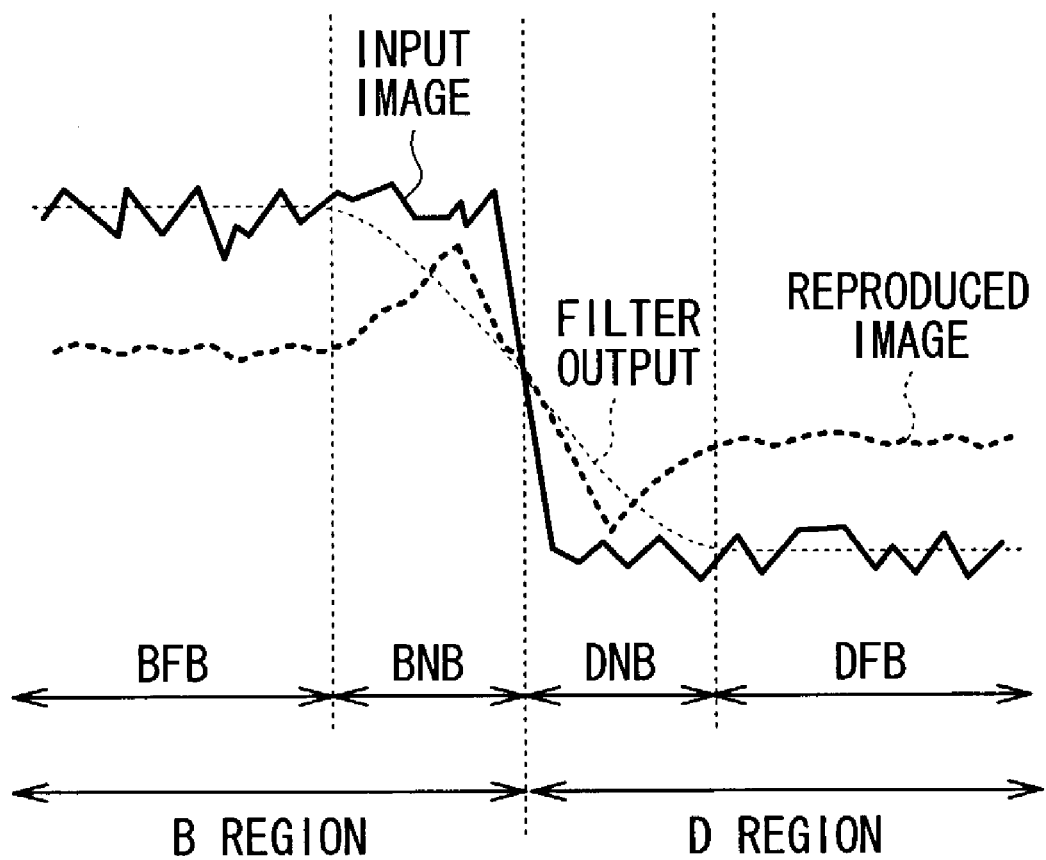
FIG. 21 is an illustration for explaining a problem of Multiscale retinex method.

Next, effects of the embodiment on a conventional method using the linear lowpass filter will be described below. Herein, for the sake of simplifying the description, the image is indicated as a one-dimensional signal. The problems of the conventional method have been already described in paragraphs of "Background Art" referring to FIG. 21, and in order to overcome the problems, while a boundary (illumination boundary) between regions with different illumination conditions is stored, it is required to smooth a region under the same illumination. Experientially, a change in the pixel level resulting from a change in an illumination strength is much larger than a change in the pixel level resulting from a reflectivity of a surface of an object. Consequently, an edge with a large pixel level occurs in the illumination boundary.

Figure 7A:
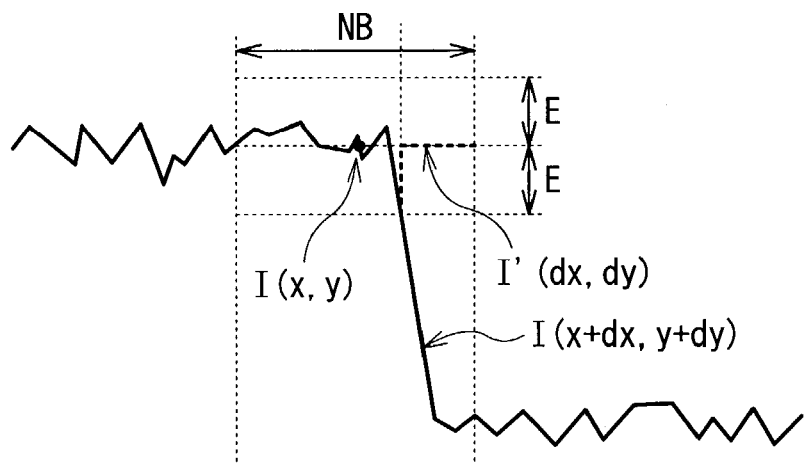
FIGS. 7A and 7B are illustrations for explaining an effect of the epsilon filter.
Figure 7B:
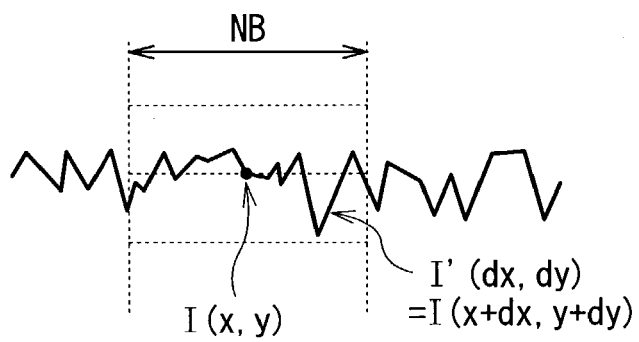

As shown in FIG. 7A, in proximity to such edge, the pixel value I(x+dx, y+dy) giving a large difference absolute value AD(dx, dy) exceeding the threshold E(x, y) exists in the neighboring region NB of the pixel of interest in the epsilon filter 12. The pixel value I(x+dx, y+dy) can be replaced with the value I(x, y) of the pixel of current interest (a value at the center of the neighboring region NB) as indicated by a thick broken line (I'(dx, dy)) in FIG. 7A by the comparator 22 (refer to FIG. 4), so the pixel value I(x+dx, y+dy) does not greatly contribute smoothing by Mathematical Formula 13, and consequently, the shape of the edge is stored. On the other hand, in a portion except for the illumination boundary, as shown in FIG. 7B, a change in the pixel level is not so large and the difference absolute value AD(dx, dy) is smaller than the threshold E(x, y) in the whole neighboring region NB of the pixel of interest. In this case, all of the value J(dx, dy) in Mathematical Formula 12 is equal to the input pixel value I(x+dx, y+dy), and the epsilon filter is equivalent to a simple linear lowpass filter, so the whole neighboring region NB is smoothed.

Thus, the epsilon filter 12 is superior in performance of storing the edge to the linear filter, and can effectively extract the illumination component from an image with different illumination lights. However, in a conventional fixed threshold epsilon filter generally used to remove noise, a discontinuous waveform is generated in the output thereof in proximity to the edge, so when the epsilon filter is used to compress the dynamic range, an unnatural image pattern which does not exist in an original image may be generated in the reproduced image after compression.

Figure 8A:
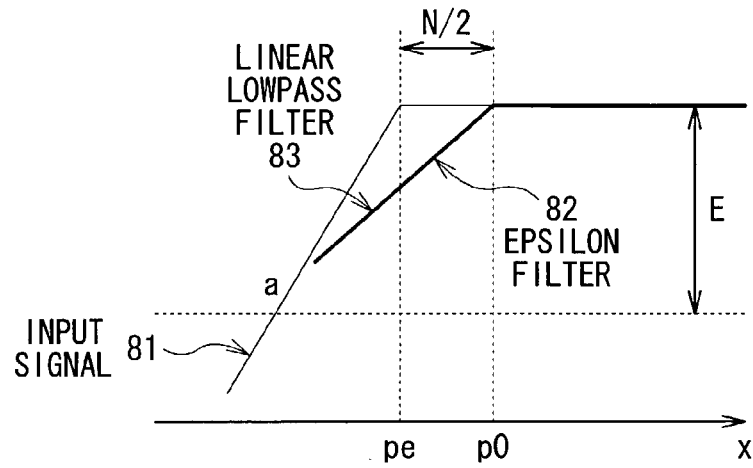
FIGS. 8A and 8B are illustrations for explaining behavior of a fixed threshold epsilon filter in a neighborhood of an edge.
Figure 8B:
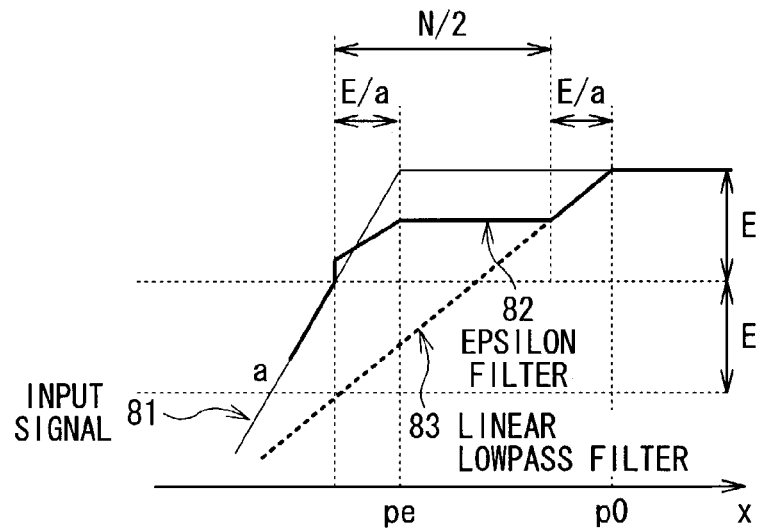

For the sake of describing the problem, FIGS. 8A and 8B show the output of the conventional fixed threshold epsilon filter in a modeled edge and its proximity. Herein, only a portion from an edge center portion to the high level side is taken into consideration, and an edge portion where the level is steeply changed approximates to a direct line of a gradient a, and a portion in proximity to the edge except for the edge portion approximates to a flat direct line of a gradient 0. In FIGS. 8A and 8B, the input signal, the output of the epsilon filter and the output of the corresponding linear lowpass filter are indicated by a thin solid line 81, a thick solid line 82 and a thick broken line 83, respectively. The linear lowpass filter used in the epsilon filter is an average filter. Further, the size of the neighboring region of the pixel of interest in the used epsilon filter is N, and the threshold thereof is E. FIG. 8A shows the output of the epsilon filter when the relationship of Mathematical Formula 20 among a, N, and E is established.

In FIG. 8A, a lateral axis indicates a spatial position coordinate, and the value of the coordinate gradually increases toward the right. "p0" indicates a position at a distance of N/2 from a falling point pe of the edge. In this case, the epsilon filter behaves as equivalent to the linear lowpass filter. However, a level change in the image due to a change in illumination light steeply occurs (the gradient a is large), and a large filter is required to be used (N is large) in order to effectively compress the dynamic range as described above, so it is considered that Mathematical Formula 20 is not generally established in the illumination boundary where an illumination condition is changed.

On the other hand, FIG. 8B shows the output of the epsilon filter when Mathematical Formula 20 is not established. In FIG. 8B, in the waveform of the output from the right to the left, the output from p0 to p0-E/a is the same as that of the linear filter, and the output from p0-E/a to pe is a uniform value. The output from pe to pe-E/a declines according to a quadratic curve, however, under the condition where Mathematical Formula 20 is not established, the output never fails to intersect with the direct line 81 indicating the input signal therebetween. The output in pe-E/a becomes discontinuously the same value as that of the input signal, and then the input signal is outputted as it is. This behavior of the fixed threshold epsilon filter is for a simplified edge model, but it is obvious that a complicated waveform is outputted in proximity to the edge. Specifically, around pe-E/a, a waveform which is discontinuously changed, and has a larger gradient than the input signal is outputted.

In order to make the output image O(x, y) a natural reproduced image, a local shape (a direction of a spatial gradient) in each position on the image is required to be stored. In other words, as shown in Mathematical Formula 21, a sign of a differential value O'(x, y) of the output image O(x, y) and a sign of a differential value I'(x, y) of the input image I(x, y) must match each other.

Herein, a sign (x) indicates a sign of x. When the condition of Mathematical Formula 21 is not satisfied, inversion of a level gradient between the input image and the output image occurs, and thereby an image pattern which does not exist in the input image is generated in the output image. For example, the input image shown in FIG. 9A is outputted as shown in FIG. 9B. In the output image in FIG. 9B, a pattern 90 which does not exist in the input image is generated due to the inversion of the level gradient. However, a discontinuous behavior of the epsilon filter in proximity to the edge shown in FIG. 8B may cause difficulty in establishing the condition of Mathematical Formula 21, which thereby may result in the occurrence of inversion of the level gradient.

Whether or not establishing Mathematical Formula 21 depends upon the behavior of the epsilon filter and the level conversion function T(l) applied to the output. In order to prove it, Mathematical Formula 9 is substituted into Mathematical Formula 11 to obtain Mathematical Formula 22 indicating a relationship of the input image I(x, y) and the output image O(x, y).

CR(x, y)/R(x, y) in the right side of Mathematical Formula 22 corresponds to the above-described coefficient calculation function F(R(x, y)). The both sides of Mathematical Formula 22 are differentiated to substitute into Mathematical Formula 21, thereby the condition which the output image O(x, y) must satisfy indicates like Mathematical Formula 23.

In order to make clearer the involvement of the level conversion function T(l) in the condition, FIG. 10 shows a relationship of the level conversion function T(l) to the output of the epsilon filter. A lateral axis indicates the output of the epsilon filter (input into the level conversion function T(l)), and a vertical axis indicates the output of the level conversion function T(l). Herein, an output of the epsilon filter of an pixel is R, a value of the output after the level conversion is CR, and a value of their ratio CR/R is a. In other words, "a" corresponds to a gradient of a direct line passing through an origin point and (R, CR) (Mathematical Formula 24).

Further, where a spatial differential value of the output of the epsilon filter in the same pixel is R', R' is considered to correspond to a size of a minute range with R on the lateral axis in FIG. 10 as a center (R has an adequate sign according to a direction of calculating the differential value on the image). Therefore, where a differential coefficient regarding "l" of the level conversion function T(l) corresponding to R is b, a spatial differential value after the level conversion can approximate by Mathematical Formula 25.

By substituting Mathematical Formulas 24 and 25 into Mathematical Formula 22, a condition of Mathematical Formula 26 consisting of a portion R'/R regarding the output of the epsilon filter and a portion (1-b/a) regarding a property of the level conversion function T(l) can be obtained.

Incidentally, the level conversion function T(l) for compressing the illumination component generally has the monotone increasing property, so values of a and b are positive, so Mathematical Formula 27 is established.

Figure 11A:
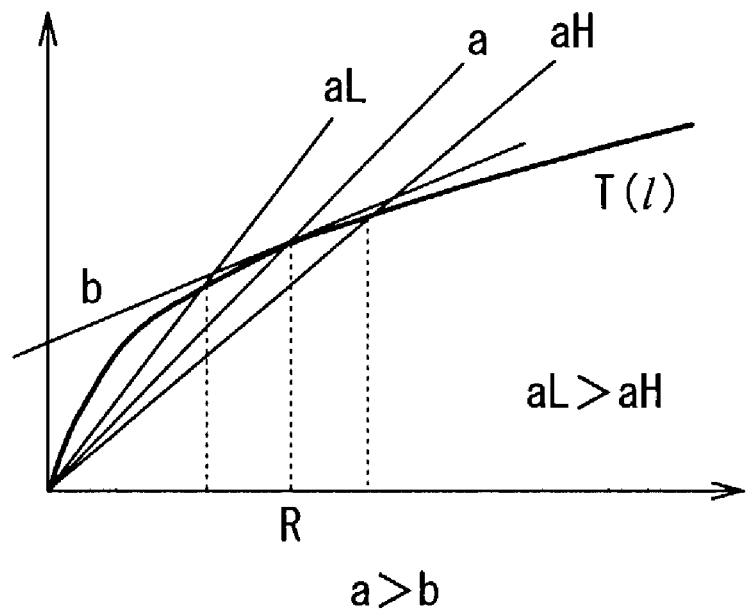
FIGS. 11A and 11B are illustrations for explaining a inequality relationship between an input level and a compression ratio in a level conversion curve.
Figure 11B:
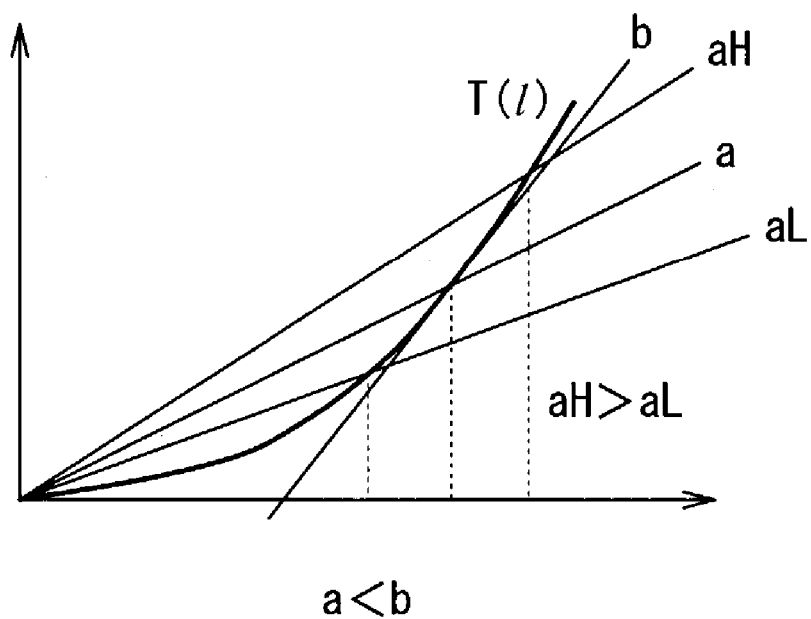

Further, 1-b/a∞0 means a∞b, and in this case, it means that in a neighborhood of an illumination component level R, the larger the level is, the larger the compression is performed. It is because a compression ratio of the level R is a, and when the neighborhood thereof is uniformly compressed, a gradient of the level conversion function T(l) in the neighborhood of the level R is required to be a, however, the actual gradient is b which is smaller, so as shown in FIG. 11A, the higher the level side is, the larger compression is performed. On the other hand, in the case of 1-b/a, that is, a<b, as shown in FIG. 11B, the lower the level side is, the larger compression is performed. As in the case of FIG. 10, the vertical axes and the lateral axes of FIGS. 11A and 11B indicate the output of the epsilon filter (the input into the level conversion function T(l)) and the output of the level conversion function T(l), respectively.

In a flat portion except for a portion in proximity to the edge, the epsilon filter functions as a lowpass filter, so a ratio of a spatial change in the output is generally smaller than that in the input image. Therefore, it can be assumed that in the portion, two conditions indicated in Mathematical Formulas 28A and 28B are established.

In the case of I'∞0, R'∞0 is established by Mathematical Formulas 28A and 28B, so if 1-b/a is negative, Mathematical Formula 26 is always established. Further, in the case of 0 1-b/a 1, Mathematical Formula 2 9 is established by I'/I∞R'/R obtained by Mathematical Formulas 28A and 28B.

Likewise, in the case of I'<0, it can be easily found that Mathematical Formula 26 is established.

On the other hand, as shown in FIG. 8B, the epsilon filter outputs the input signal as it is in the edge center portion, so it is considered that Mathematical Formula 30 is established in the portion, and also in this case, it is obvious that Mathematical Formula 26 is satisfied.

In the embodiment, when the epsilon filter 12 is removed so that R(x, y)=I(x, y) is established, the output of CR(x, y) is equivalent to that in the conventional method using only the level conversion, which corresponds to the case where the condition of Mathematical Formula 30 is established throughout the image, therefore, in the conventional method, inversion of the level gradient will not occur.

In a portion where these conditions are not satisfied, whether or not establishing Mathematical Formula 26 depends upon the output of the epsilon filter 12 and the property of the level conversion function T(l). The property of the level conversion function T(l) should be determined by how to compress the illumination component, so a description will be given of how the output of the epsilon filter 12 has an influence on the establishment of Mathematical Formula 26 with four cases (1) through (4).

(1) In the case where I'∞0 and R' are the same signs as 1-b/a;
the values on the right side and the left side are positive, so the larger the absolute value of R'/R is, the more difficult it is to establish Mathematical Formula 26.

(2) In the case where I'∞0 and R' are different signs from 1-b/a;
the value on the right side is positive and the value on the left side is negative, so Mathematical Formula 26 is always established.

(3) In the case where I'<O and R' are the same signs as 1-b/a;
the value on the right side is negative and the value on the left side is positive, Mathematical Formula 26 is always established.

(4) In the case where I'<O and R' are different signs from 1-b/a;
the values on the right side and the left side are negative, so the larger R'/R is, the more difficult it is to establish Mathematical Formula 26.

In the above conditions (2) and (3), in the neighboring region, the higher the level of the input image is, the less compression is performed, so there is no possibility that inversion of the gradient occurs. Therefore, irrespective of the value of R'/R, Mathematical Formula 26 is always established. On the other hand, in the conditions (1) and (4), the larger the absolute value of R'/R is, the more possibility there is that Mathematical Formula 26 is not satisfied. However, at least the ratio is the same as that of the input image, as described above, Mathematical Formula 26 is established. In the embodiment, the threshold E of the epsilon filter 12 is variable, and a signal as similar as possible to the input image is outputted in the edge portion, that is, the threshold is controlled so that the larger the edge strength G(x, y) is, the smaller the threshold E of the epsilon filter 12 becomes, thereby the inversion of the gradient can be limited to a minimum, and a natural image can be reproduced so as not to generate the unnatural pattern 90 shown in FIG. 9B.

The level conversion function T(l) shown in FIG. 3 is just an example, so any function can be used depending upon a purpose. For example, the function shown in Mathematical Formulas 1 or 2 may be used.

As described above, according to the embodiment, the edge strength G(x, y) is calculated per position on the input image, and on the basis of the edge strength G(x, y), the threshold E(x, y) of the epsilon filter 12 is controlled to filter the input image. Further, the coefficient F(R(x, y)) calculated according to the output value R(x, y) from the epsilon filter 12 is multiplied by the input pixel value I(x, y) as shown in Mathematical Formula 16 to convert the pixel value per pixel and compress the dynamic range. Therefore, even if a plurality of different illuminations exist, the boundary thereof can be appropriately extracted, and an unnatural image pattern can be prevented from being generated, thereby subjectively preferable compression of the dynamic range can be achieved. In other words, by the use of the epsilon filter 12, the illumination component is extracted from the input image, and the illumination component is compressed, thereby while a local contrast is stored, the whole dynamic range is reduced, so a subjectively preferable reproduced image can be obtained. At this time, on the basis of the edge strength G(x, y), the threshold E of the epsilon filter 12 is adaptively changed according to a local gradient of the pixel value I(x, y), so the illumination boundary can be more accurately extracted than in the case of using the linear lowpass filter or the fixed threshold epsilon filter.

[Second Embodiment]

Next, a second embodiment of the invention will be described below. In the description below, like components are denoted by like numerals as of the first embodiment and will not be further explained.

Figure 12:
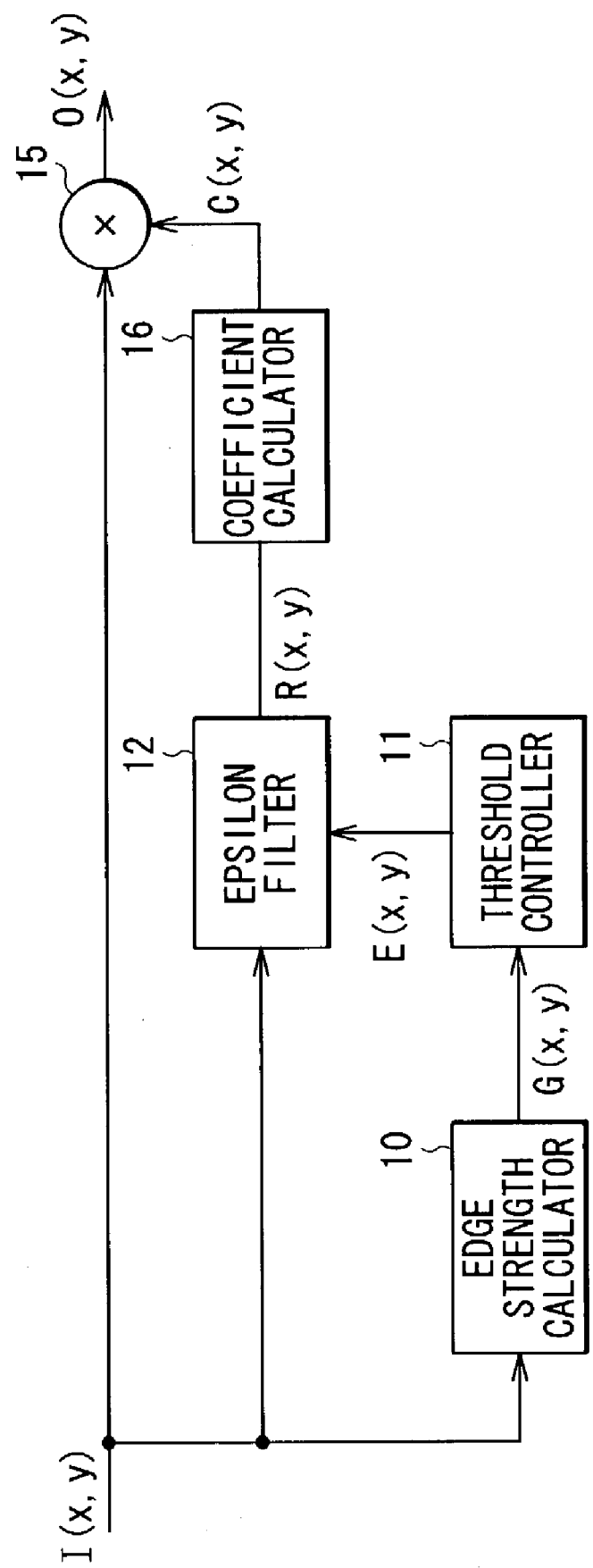
FIG. 12 is a block diagram showing a structure of an image processing apparatus according to a second embodiment of the invention.

FIG. 12 shows a structure of an image processing apparatus according to the second embodiment of the invention. Although a general function of the image processing apparatus according to the embodiment is the same as that according to the first embodiment, it is distinguished from the first embodiment by the fact that in the embodiment, instead of the divider 13 and the level conversion device 14 (refer to FIG. 1), the image processing apparatus comprises a coefficient calculator 16 having functions of the divider 13 and the level conversion device 14. In other words, in the embodiment, the dynamic range is compressed on the basis of Mathematical Formula 16 described in the first embodiment.

Figure 13:
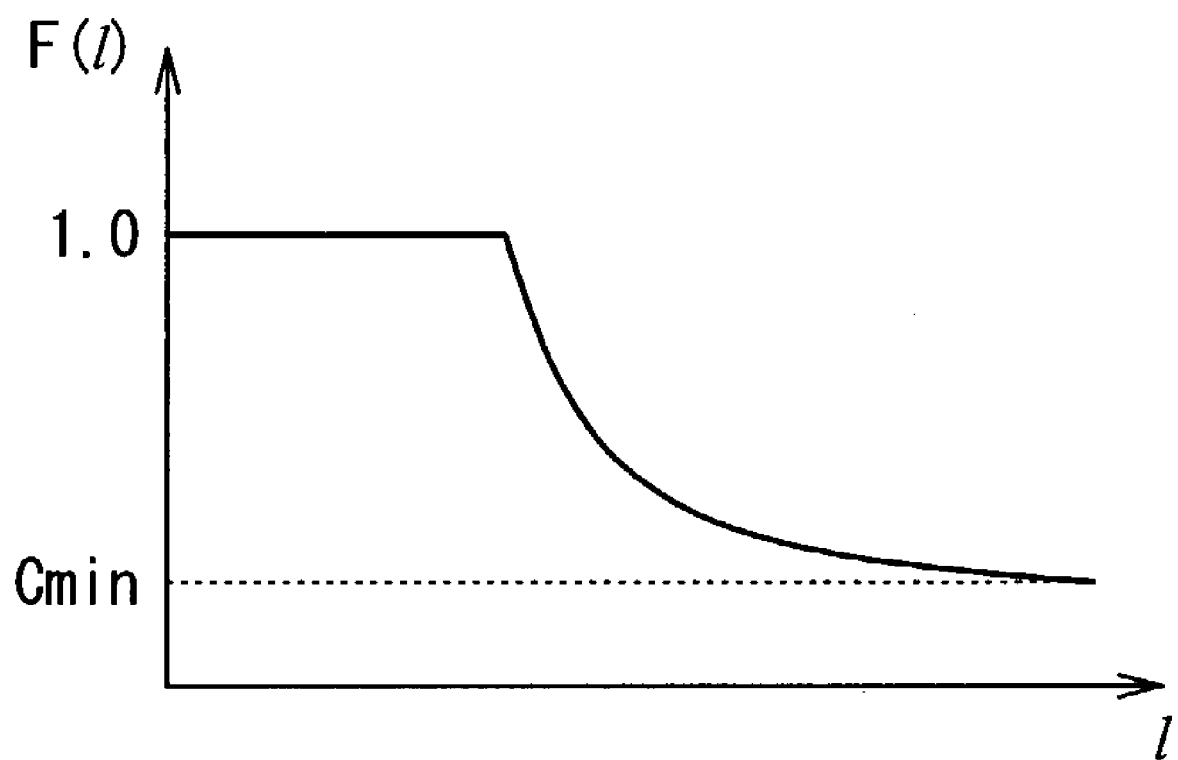
FIG. 13 is an illustration for explaining an example of a coefficient calculation function used in a coefficient calculator in the image processing apparatus shown in FIG. 12.

In the embodiment, the coefficient calculator 16 calculates a coefficient $C(x, y)$ by applying the coefficient calculation function $F(l)$ shown in FIG. 13 to the output $R(x, y)$ of the epsilon filter 12. The coefficient calculation function $F(l)$ can be obtained by the use of the level conversion function $T(l)$ by Mathematical Formula 15 as described in the first embodiment. The coefficient $C(x, y)$ calculated by the coefficient calculator 16 is transmitted to the multiplier 15.

In the embodiment, a signal indicating the input image is directly inputted into the multiplier 15, and the coefficient $C(x, y)$ calculated by the calculator 16 is inputted to the multiplier 15. In the multiplier 15, a multiplication of each pixel value $I(x, y)$ of the input image by the corresponding coefficient $C(x, y)$ is performed to reproduce the image signal, and as in the case of the first embodiment, the image signal $O(x, y)$ which is the result of the multiplication, is outputted to a transmission line, memory, a display apparatus or the like (all not shown).

Also in the embodiment, on the basis of the edge strength $G(x, y)$, the threshold $E(x, y)$ of the epsilon filter 12 is controlled to filter the input image, and by multiplying the input pixel value $I(x, y)$ by the coefficient $F(R(x, y))$ calculated according to the output value $R(x, y)$ from the epsilon filter 12, the pixel value is converted per pixel to compress the dynamic range, so the same effects as those of the first embodiment can be obtained.

[Third Embodiment]

Next, a third embodiment of the invention will be described below. In the description below, like components are denoted by like numerals as of the first embodiment and the second embodiment and will not be further explained.

Figure 14:
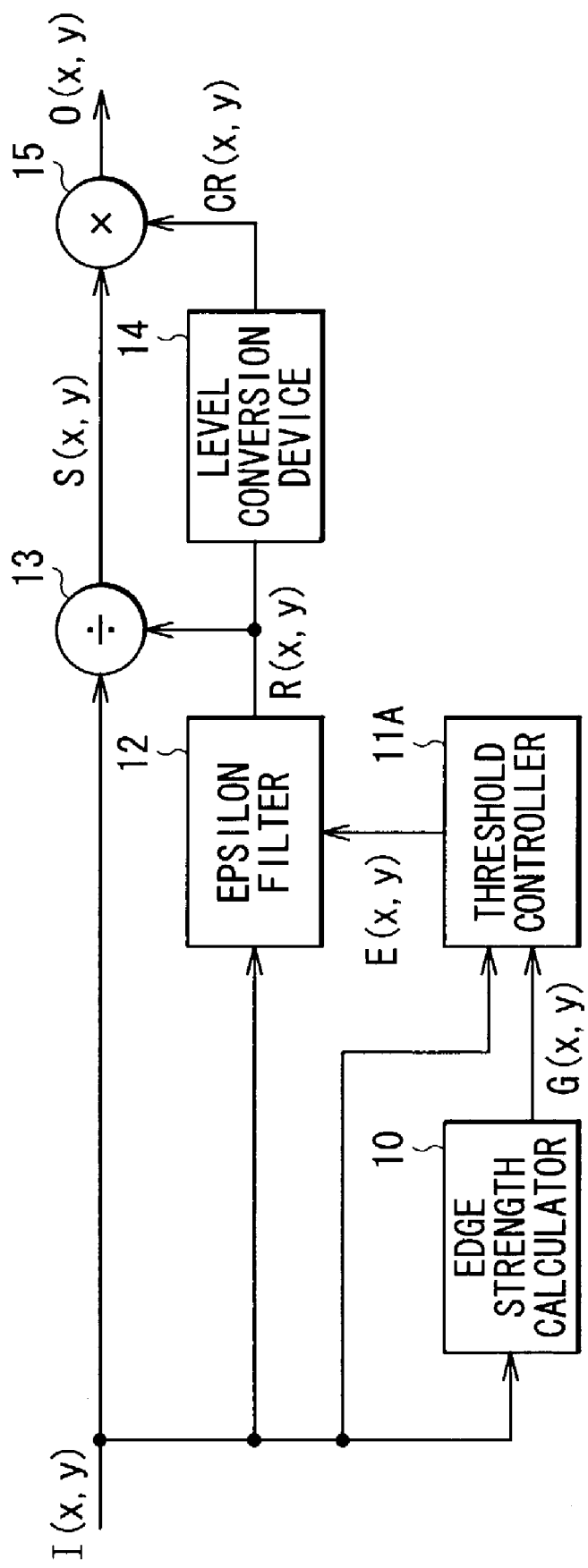
FIG. 14 is a block diagram showing a structure of an image processing apparatus according to a third embodiment of the invention.

FIG. 14 shows a structure of an image processing apparatus according to the third embodiment of the invention. Although the structure of the image processing apparatus according to the embodiment is substantially the same as that according to the first embodiment (refer to FIG. 1), it is distinguished from the first embodiment by the fact that in addition to the edge strength $G(x, y)$ which is the output from the edge strength calculator 10, the pixel value $I(x, y)$ of the input image is directly inputted into the threshold controller 11.

In the embodiment, a threshold controller 11A controls the threshold $E(x, y)$ used in the epsilon filter 12 in a subsequent stage by not only the edge strength $G(x, y)$ but also the pixel level of the input image. More specifically, the threshold controller 11A controls the threshold $E(x, y)$ so that the larger the pixel value $I(x, y)$ of the input image is, the larger the threshold $E(x, y)$ becomes, and the larger the edge strength $G(x, y)$ is, the smaller the threshold $E(x, y)$ becomes.

Such threshold control can be achieved as follows. For example, at first, by the use of a predetermined positive coefficient r (r 1.0), by Mathematical Formula 31, a temporary threshold $Etmp(x, y)$ is set so that the larger the pixel value $I(x, y)$ of the input image is, the larger the value of the temporary threshold $Etmp(x, y)$ becomes.

After that, the threshold $Etmp(x, y)$ is corrected by the edge strength $G(x, y)$ to determine the threshold $E(x, y)$ actually used. For example, assuming that constants Emin and Emax for normalization in Mathematical Formula 8 are 0.0 and 1.0, respectively, the coefficient $G(x, y)$ corresponding to the edge strength is calculated by Mathematical Formula 8. The temporary threshold $Etmp(x, y)$ is multiplied by the coefficient $G(x, y)$ as shown in Mathematical Formula 32 to determine a final threshold $E(x, y)$. Thereby, the threshold $E(x, y)$ can be controlled so that the larger the pixel value $I(x, y)$ of the input image is, the larger the value of the final threshold $E(x, y)$ becomes, and the larger the edge strength $G(x, y)$ is, the smaller the value of the final threshold $E(x, y)$ becomes.

The threshold $E(x, y)$ of the epsilon filter 12 plays a role of discriminating whether a spatial change in the input pixel occurs by a change in the illumination component or a change in a reflectivity of a surface of an object. Even in the case where the change in the reflectivity of the surface of the object is small, as long as the illumination level is large, a change in the pixel value $I(x, y)$ becomes large. Therefore, how to discriminate between a large change in the illumination level and a small change in the reflectivity under strong illumination is an issue. In the embodiment, the threshold $E(x, y)$ of the epsilon filter 12 is set so that the larger the pixel level is, the larger the threshold $E(x, y)$ becomes. Thereby, an influence of the illumination level on a change in the pixel value $I(x, y)$ can be reduced, and the illumination component can be more appropriately extracted.

As described above, according to the embodiment, the threshold $E(x, y)$ of the epsilon filter 12 is controlled with consideration of not only the edge strength $G(x, y)$ but also the pixel level of the input image, so in the epsilon filter 12, the illumination component can be more appropriately extracted.

[Fourth Embodiment]

Next, a fourth embodiment of the invention will be described below. In the description below, like components are denoted by like numerals as of the first, the second and the third embodiments and will not be further explained.

Figure 15:
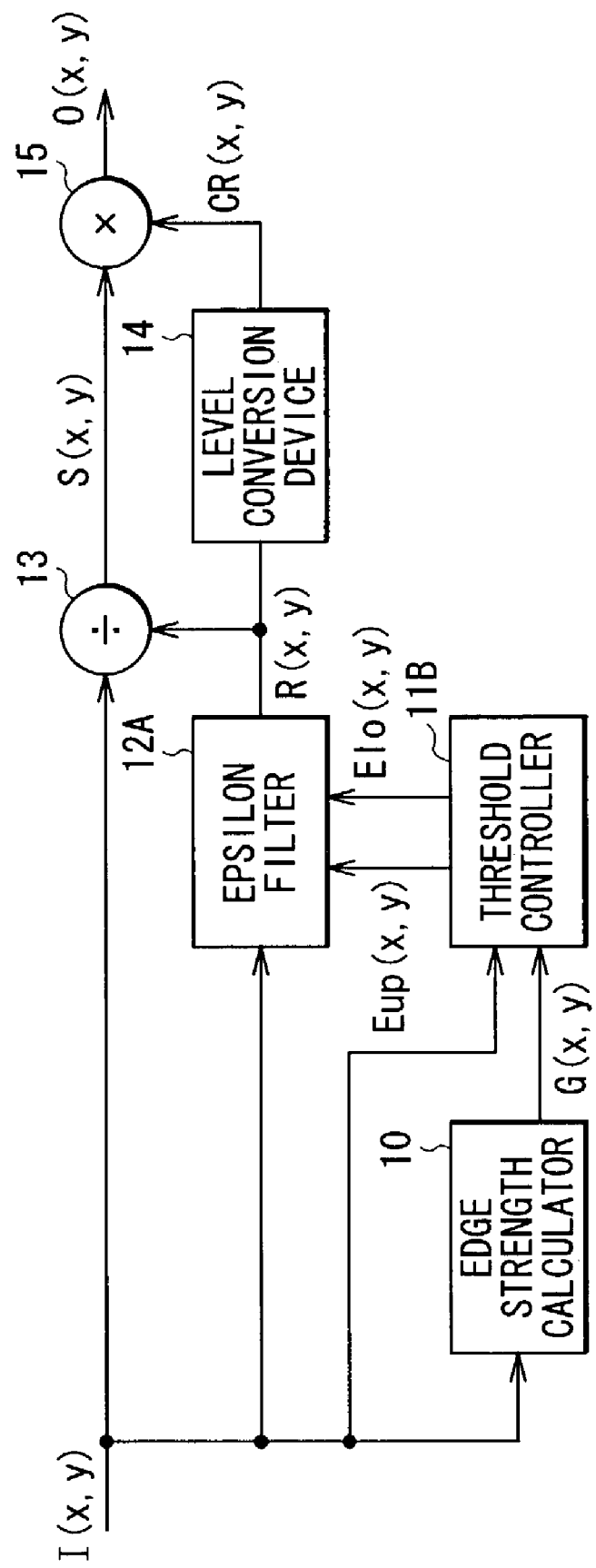
FIG. 15 is a block diagram showing a structure of an image processing apparatus according to a fourth embodiment of the invention.

FIG. 15 shows a structure of an image processing apparatus according to the fourth embodiment of the invention. Although the structure of the image processing apparatus according to the embodiment is substantially the same as that according to the third embodiment (refer to FIG. 14), it is distinguished from the third embodiment by the fact that the threshold of the epsilon filter is controlled by the use of two kinds of thresholds $Elo(x, y)$ and $Eup(x, y)$ per pixel.

In the embodiment, a threshold controller 11B calculates the two kinds of thresholds $Elo(x, y)$ and $Eup(x, y)$ having different values from each other per pixel to control the threshold of an epsilon filter 12A by the thresholds $Elo(x, y)$ and $Eup(x, y)$. In other words, in the threshold controller 11B, for example, by the use of two predetermined coefficient with different values rl and ru (0.0 rl, ru 1.0), as shown in Mathematical Formulas 33A and 33B, two kinds of temporary thresholds $Etmplo(x, y)$ and $Etmpup(x, y)$ are calculated. Then, the temporary thresholds $Etmplo(x, y)$ and $Etmpup(x, y)$ are outputted to the epsilon filter 12A as a first threshold $Elo(x, y)$ and a second threshold $Eup(x, y)$, respectively.

Figure 16:
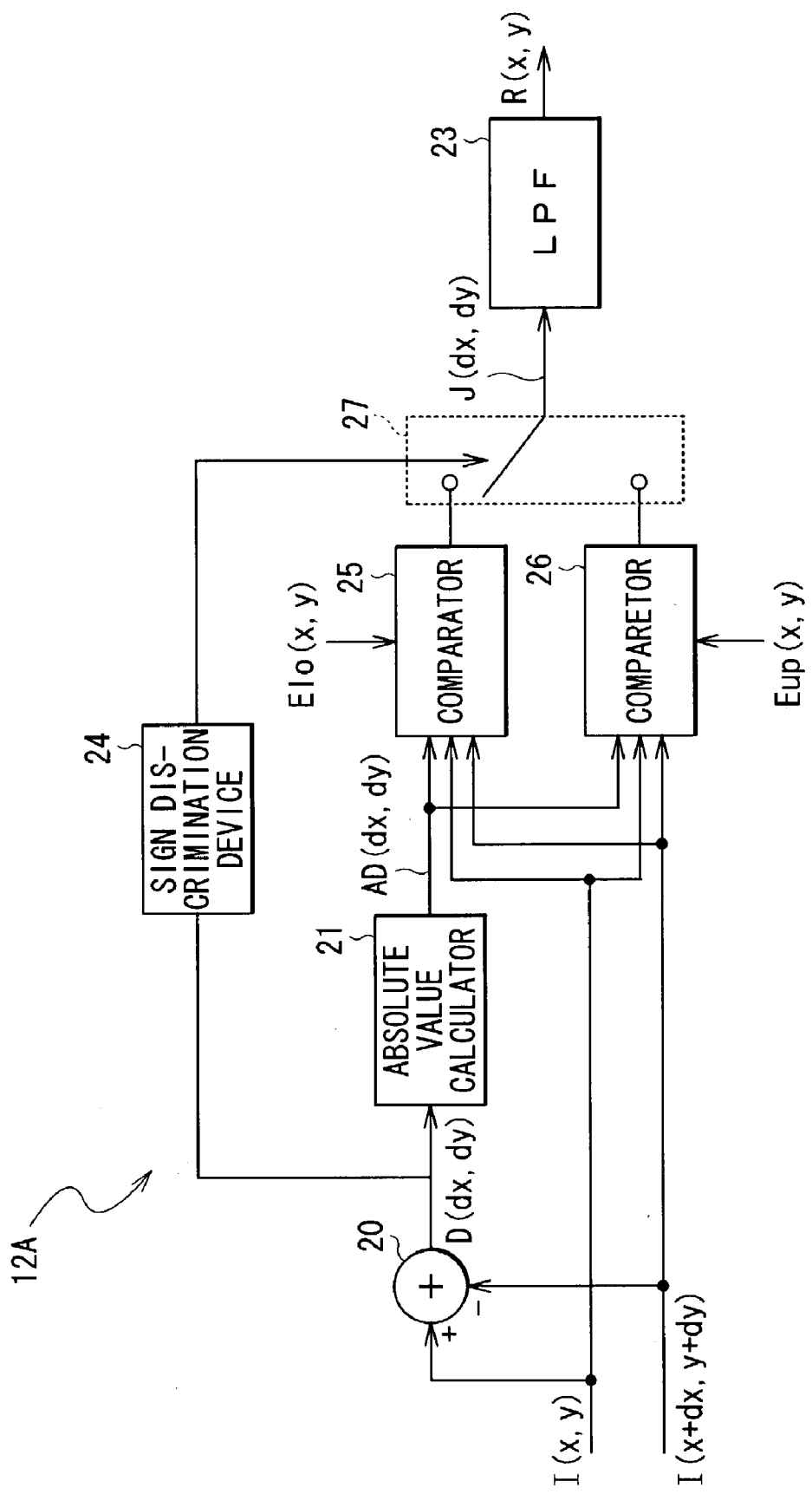
FIG. 16 is an illustration for explaining a structure of an epsilon filter in the image processing apparatus shown in FIG. 15.

In the embodiment, in the epsilon filter 12A, threshold processing is performed with the two thresholds $Elo(x, y)$ and $Eup(x, y)$ calculated by the threshold controller 11B. More specifically, processing in the epsilon filter 12A is performed as below with, for example, the structure shown in FIG. 16. The difference value $D(x, y)$ calculated by the difference device 20 is transmitted to the absolute value calculator 21 as well as a sign discrimination device 24 in the embodiment.

In the sign discrimination device 24, the sign of the difference value $D(x, y)$ is discriminated, and a discriminated result is transmitted to a switch 27.

A first comparator 25 selects a signal by Mathematical Formula 12 by the use of the first threshold $Elo(x, y)$ transmitted from the threshold controller 11B as in the case of the first embodiment. In other words, when a comparison between the value $AD(dx, dy)$ calculated by the absolute value calculator 21 and the threshold $Elo(x, y)$ is performed, according to the result of the comparison, either the value $I(x, y)$ of the pixel of interest or the value $I(x+dx, y+dy)$ of the neighboring pixel is selected, and the selected value is outputted as the value $J(dx, dy)$.

In a second comparator 26, by the use of the second threshold $Eup(x, y)$ transmitted from the threshold controller 11B, a signal is selected by Mathematical Formula 12 as in the case of the first embodiment. In other words, when a comparison between the value $AD(dx, dy)$ calculated by the absolute value calculator 21 and the threshold $Eup(x, y)$ is performed, according to the result of the comparison, either the value $I(x, y)$ of the pixel of interest or the value $I(x+dx, y+dy)$ of the neighboring pixel is selected, and the selected value is outputted as the value $J(dx, dy)$.

In the switch 27, on the basis of the result of discrimination by the sign discrimination device 24, either the output of the first comparator 25 or the second comparator 26 is selected to be transmitted to the linear lowpass filter 23. In the switch 27, for example, in the case where the result of sign discrimination indicates positive, the output of the first comparator 25 is selected. On the other hand, in the case where the result indicates negative, the output of the second comparator 26 is selected.

In the embodiment, when the value $I(x+dx, y+dy)$ of the neighboring pixel is larger than the value (the value at the center of the neighboring region NB) $I(x, y)$ of the pixel of current interest, the threshold $Eup(x, y)$ is used, and when it is smaller, the threshold $Elo(x, y)$ is used. In other words, in the epsilon filter 12A, a different threshold depending on the high level side and the low level side can be set. Specifically, when the second threshold $Eup(x, y)$ is larger than the first threshold $Elo(x, y)$, as in the case of the third embodiment, an influence of the illumination component included in a change in the pixel value can be reduced, and the illumination component can be more appropriately extracted.

[Fifth Embodiment]

Next, a fifth embodiment of the invention will be described below. In the description below, like components are denoted by like numerals as of the first, the second, the third and the fourth embodiments and will not be further explained.

Figure 17:
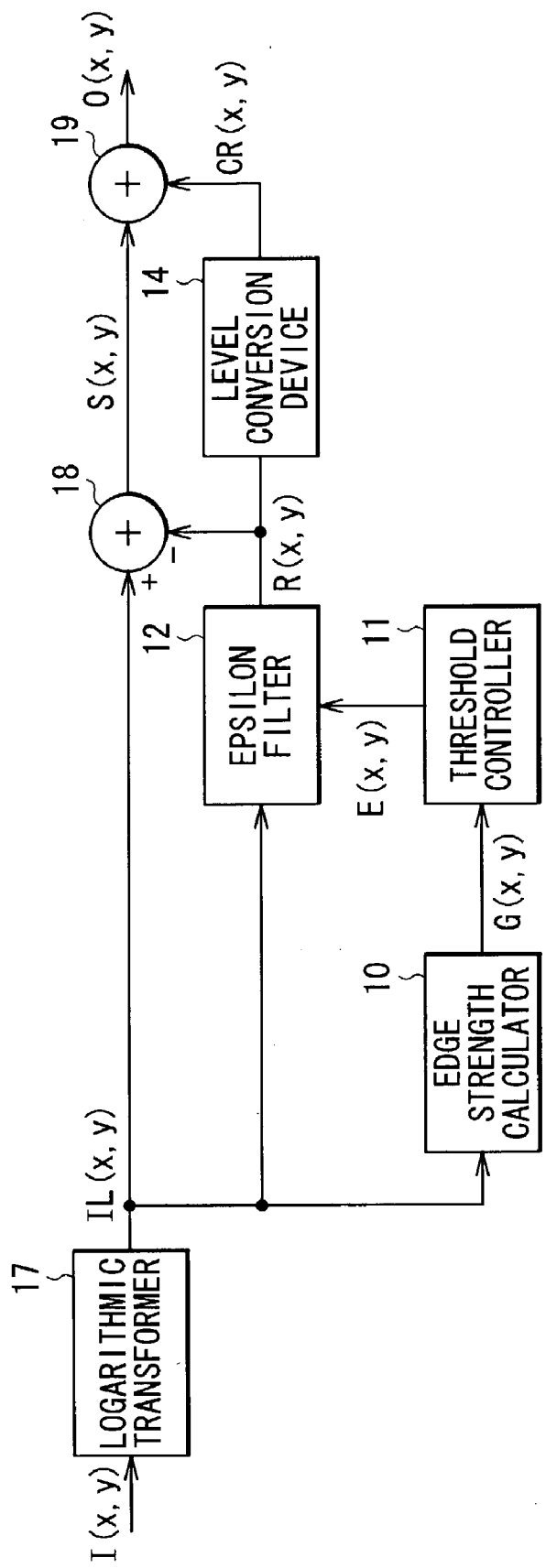
FIG. 17 is a block diagram showing a structure of an image processing apparatus according to a fifth embodiment of the invention.
Figure 18:
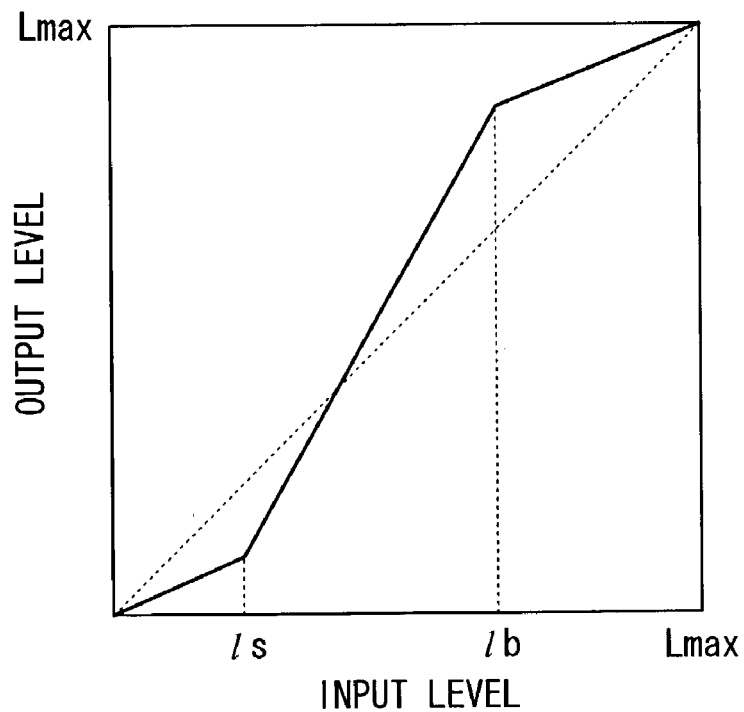
FIG. 18 is an illustration for explaining an example of a conventionally used level conversion function.
Figure 19:
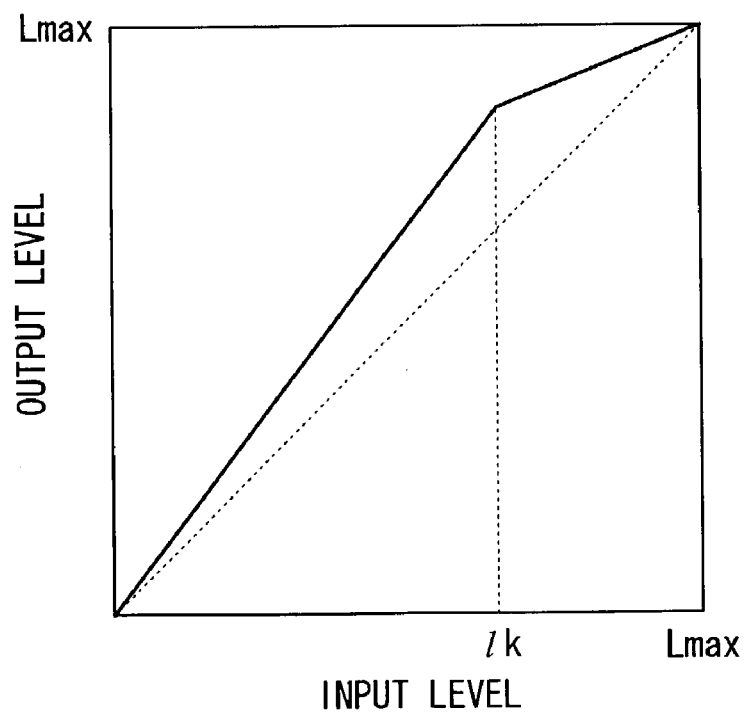
FIG. 19 is an illustration for explaining an example of another conventionally used level conversion function.
Figures 20A, 20B:
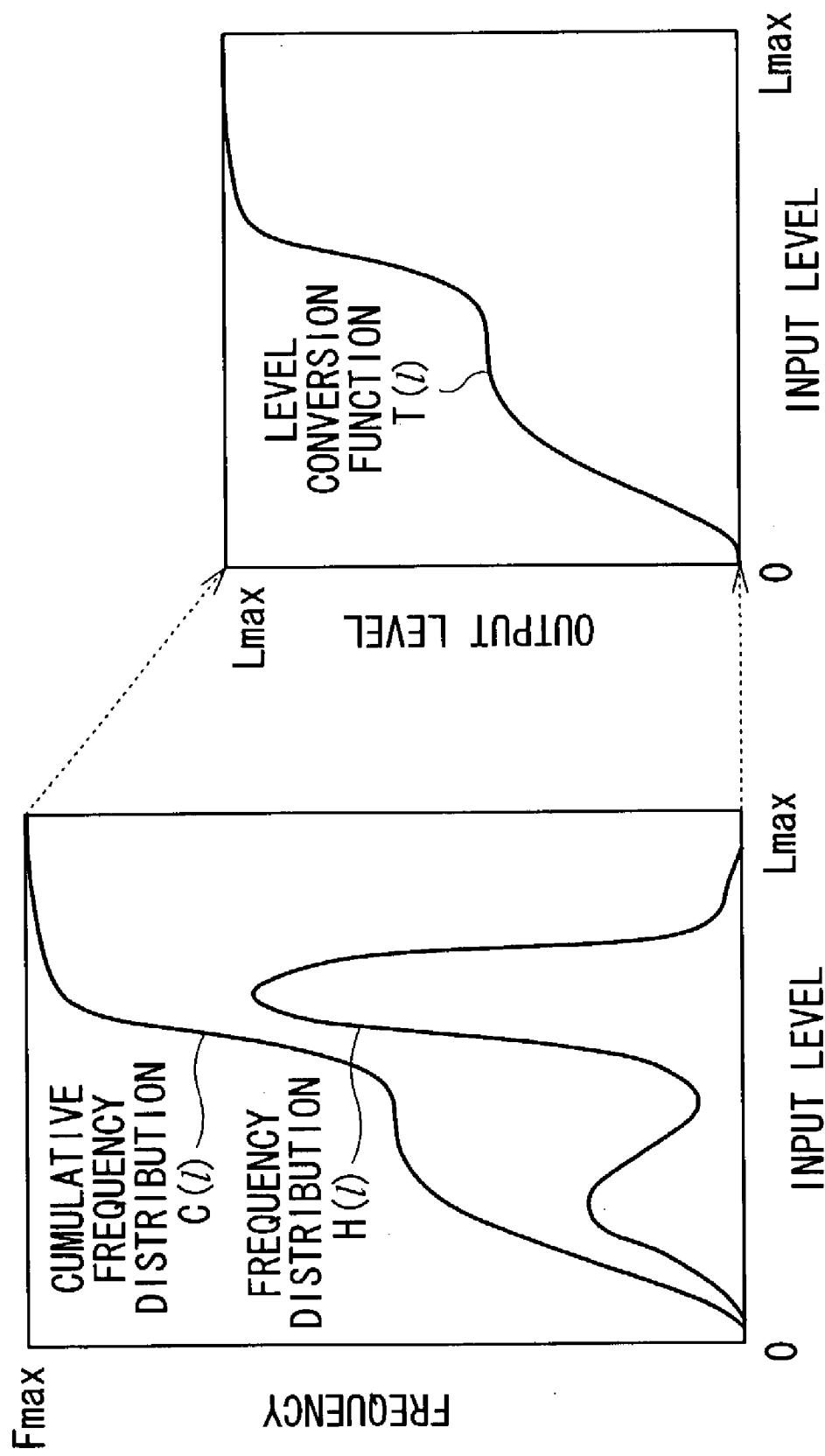
FIGS. 20A and 20B are illustrations for explaining a principle of histogram equalization.

FIG. 17 shows a structure of an image processing apparatus according to the fifth embodiment of the invention. Although the structure of the image processing apparatus according to the embodiment is similar to that according to the first embodiment (refer to FIG. 1), it is distinguished from the first embodiment by the fact that specifically nonlinear transformation such as logarithmic transformation is performed on the pixel level of the input image.

In other words, in the embodiment, a logarithmic transformer 17 is disposed in an input stage of a circuit, and at first, logarithmic transformation shown in Mathematical Formula 1 is performed on each pixel value $I(x, y)$ of the input image. Accordingly, the divider 13 for subtracting the illumination component $R(x, y)$ obtained by the epsilon filter 12 and the multiplier 15 for multiplying the non-illumination component $S(x, y)$ by the compressed illumination component $CR(x, y)$ are replaced with a subtracter 18 and an adder 19, respectively. It is based upon a well-known fact that after the logarithmic transformation, multiplication and division become addition and subtraction, respectively.

A pixel value $IL(x, y)$ of the input image which is logarithmically transformed by the logarithmic transformer 17 is transmitted to the edge strength calculator 10, the epsilon filter 12 and the subtracter 18. In the edge strength calculator 10 and the epsilon filter 12, on the basis of the pixel value $IL(x, y)$, the same processing as that in the first embodiment is performed. On the other hand, in the subtracter 18, a subtraction of the illumination component $R(x, y)$ obtained in the epsilon filter 12 from each pixel value $IL(x, y)$ is performed to remove the illumination component from the input image, and the non-illumination component $S(x, y)$ obtained by the result of the subtraction is outputted to the adder 19. In the adder 19, the correction illumination component $CR(x, y)$ is added to the non-illumination component $S(x, y)$ to reproduce the image signal, and then as in the case of the first embodiment, the reproduced image signal $O(x, y)$ is outputted to a transmission line, memory, a display apparatus or the like (all not shown).

The logarithmic transformation used in the embodiment has a compression effect of the dynamic range, so the higher the input level is, the more the pixel value $I(x, y)$ is compressed. Thereby, as in the case of the third and the fourth embodiments, an influence of the illumination level on a spatial change in the pixel value can be reduced, and the illumination component can be more appropriately extracted.

In the embodiment, although an example that the logarithmic transformation is used as the nonlinear transformation is described, any nonlinear transformation other than the logarithmic transformation may be used.

As described above, according to the image processing method or the image processing apparatus of the invention, on the basis of the edge strength calculated per position on the input image, the threshold used in the epsilon filter can be controlled, and according to the output value from the epsilon filter in which the threshold is controlled, the coefficient for converting the pixel value is calculated, and the pixel value is converted per pixel by the use of the calculated coefficient. Therefore, even if a plurality of different illuminations exist, the boundary thereof can be appropriately extracted, and an unnatural image pattern can be prevented from being generated, therefore subjectively preferable compression of the dynamic range can be achieved.

Obviously many modifications and variations of the present invention are possible in the light of the above teachings. It is therefore to be understood that within the scope of the appended claims the invention may be practiced otherwise than as specifically described.

$$T(l) = \left(\frac{l}{Lmax}\right)^g \times Lmax \quad \text{(MATHEMATICAL FORMULA 1)}$$

$$T(l) = \frac{\log(l)}{\log(Lmax)} \times Lmax \quad \text{(MATHEMATICAL FORMULA 2)}$$

$$C(l) = \sum_{k=0}^{l} H(k) \quad \text{(MATHEMATICAL FORMULA 3)}$$

$$T(l) = \frac{C(l)}{Fmax} \times Lmax \quad \text{(MATHEMATICAL FORMULA 4)}$$

$$O(x, y) = \log(I(x, y)) - \log(LPF(I(x, y))) \quad \text{(MATHEMATICAL FORMULA 5)}$$

$$G(x, y) = |I(x-d, y) - I(x+d, y)| + |I(x, y-d) - I(x, y+d)| \quad \text{(MATHEMATICAL FORMULA 6)}$$

$$G(x, y) = \left|\sum_{dy=-d}^{d} [I(x-d, y+dy) - I(x+d, y+dy)]\right| + \left|\sum_{dy=-d}^{d} [I(x+dx, y-d) - I(x+dx, y+d)]\right| \quad \text{(MATHEMATICAL FORMULA 7)}$$

$$E(x, y) = \begin{cases} Emin & \cdots G(x, y) > Gmax \\ \frac{Gmax - G(x, y)}{Gmax - Gmin}(Emax - Emin) + Emin & \cdots Gmin \leq G(x, y) \leq Gmax \\ Emax & \cdots G(x, y) < Gmin \end{cases} \quad \text{(MATHEMATICAL FORMULA 8)}$$

$$S(x, y) = \frac{I(x, y)}{R(x, y)} \quad \text{(MATHEMATICAL FORMULA 9)}$$

$$CR(x, y) = T(R(x, y)) \quad \text{(MATHEMATICAL FORMULA 10)}$$

$$O(x, y) = S(x, y)CR(x, y) \quad \text{(MATHEMATICAL FORMULA 11)}$$

$$J(dx, dy) = \begin{cases} I(x, y) & \cdots AD(dx, dy) > E(x, y) \\ I(x+dx, y+dy) & \cdots AD(dx, dy) \leq E(x, y) \end{cases} \quad \text{(MATHEMATICAL FORMULA 12)}$$

$$R(x, y) = \sum_{(dx, dy) \in NB} a(dx, dy) J(dx, dy) \quad \text{(MATHEMATICAL FORMULA 13)}$$

$$R(x, y) = \frac{1}{N} \sum_{(dx,dy) \in NB} J(dx, dy)$$ (MATHEMATICAL FORMULA 14)

$$F(l) = \frac{T(l)}{l}$$ (MATHEMATICAL FORMULA 15)

$$O(x, y) = I(x, y)F(R(x, y))$$ (MATHEMATICAL FORMULA 16)

$$Cmin = \frac{CRmax}{Rmax}$$ (MATHEMATICAL FORMULA 17)

$$T(l) = al + b \ldots l \geq lk$$ (MATHEMATICAL FORMULA 18)

$$c5 = \frac{a \times l5 + b}{l5} = a + \frac{b}{l5}$$ (MATHEMATICAL FORMULA 19)

$$N < \frac{2E}{a}$$ (MATHEMATICAL FORMULA 20)

$$\text{sign}(O'(x, y)) = \text{sign}(I'(x, y))$$ (MATHEMATICAL FORMULA 21)

$$O(x, y) = I(x, y)\frac{CR(x, y)}{R(x, y)}$$ (MATHEMATICAL FORMULA 22)

(MATHEMATICAL FORMULA 23)
$$\begin{cases} \frac{R'(x, y)}{R(x, y)} - \frac{CR'(x, y)}{CR(x, y)} \leq \frac{I'}{I} & \cdots I' \geq 0 \\ \frac{R'(x, y)}{R(x, y)} - \frac{CR'(x, y)}{CR(x, y)} > \frac{I'}{I} & \cdots I' < 0 \end{cases}$$

$$CR = aR$$ (MATHEMATICAL FORMULA 24)

$$CR' = bR'$$ (MATHEMATICAL FORMULA 25)

(MATHEMATICAL FORMULA 26)
$$\begin{cases} \frac{R'}{R}\left(1 - \frac{b}{a}\right) \leq \frac{I'}{I} & \cdots I' \geq 0 \\ \frac{R'}{R}\left(1 - \frac{b}{a}\right) > \frac{I'}{I} & \cdots I' < 0 \end{cases}$$

$$1 - \frac{b}{a} \leq 1$$ (MATHEMATICAL FORMULA 27)

(MATHEMATICAL FORMULA 28A)
$$\left|\frac{I'}{I}\right| \geq \left|\frac{R'}{R}\right|$$

(MATHEMATICAL FORMULA 28B)
$$\text{sign}(I'(x, y)) = \text{sign}(R'(x, y))$$

(MATHEMATICAL FORMULA 29)
$$\frac{R'}{R}\left(1 - \frac{b}{a}\right) \leq \frac{I'}{I}\left(1 - \frac{b}{a}\right) \leq \frac{I'}{I}$$

$$\frac{R'(x, y)}{R(x, y)} = \frac{I'(x, y)}{I(x, y)}$$ (MATHEMATICAL FORMULA 30)

$$Etmp(x, y) = rI(x, y)$$ (MATHEMATICAL FORMULA 31)

$$E(x, y) = Etmp(x, y)G(x, y)$$ (MATHEMATICAL FORMULA 32)

$$Etmplo(x, y) = rl \times I(x, y)$$ (MATHEMATICAL FORMULA 33A)

$$Etmpup(x, y) = ru \times I(x, y)$$ (MATHEMATICAL FORMULA 33B)

The invention claimed is:

1. An image processing method for converting an inputted image into an image with a relatively smaller dynamic range, the method comprising the steps of:
    calculating an edge strength per position on an input image;
    controlling a threshold of an epsilon filter on the basis of the calculated edge strength;
    filtering the input image by the epsilon filter by use of the threshold controlled in the step of controlling the threshold; and
    calculating a coefficient for converting a pixel value according to an output value in the step of filtering, and converting the pixel value per pixel by the calculated coefficient.

2. An image processing method according to claim 1, wherein
    in the step of calculating the edge strength, the larger a primary differential value of a pixel value in a neighboring region of a pixel of interest is, the larger a value is calculated as the edge strength.

3. An image processing method according to claim 1, wherein
    in the step of controlling the threshold, the threshold is controlled so that the larger the edge strength is, the smaller the threshold becomes.

4. An image processing method according to claim 1, wherein
    in the step of controlling the threshold, the threshold is controlled so that the larger the pixel value of the input image is, the larger the threshold becomes, and the larger the edge strength is, the smaller the threshold becomes.

5. An image processing method according to claim 1, wherein
    in the step of controlling the threshold, two thresholds with different values are calculated, and in the step of filtering, a different threshold is used depending upon whether a value of a neighboring pixel is smaller or larger than a value of a pixel of interest.

6. An image processing method according to claim 5, wherein
in the step of filtering, in the case where the value of the neighboring pixel is larger than the value of the pixel of interest, the threshold with a larger value out of the two thresholds is used, and in the case where the value of the neighboring pixel is smaller than the value of the pixel of interest, the threshold with a smaller value is used.

7. An image processing method according to claim 1, further comprising the step of:
performing nonlinear transformation on a pixel level of the input image,
wherein the input image after the nonlinear transformation is filtered by the epsilon filter.

8. An image processing method according to claim 7, wherein the nonlinear transformation is logarithmic transformation.

9. An image processing apparatus for converting an inputted image into a image with a relatively smaller dynamic range, the image processing apparatus comprising:
an edge strength calculating means for calculating an edge strength per position on an input image;
an epsilon filter for filtering the input image by use of a predetermined threshold;
a threshold control means for controlling the threshold used in the epsilon filter on the basis of the edge strength calculated by the edge strength calculating means; and
a pixel value conversion means for calculating a coefficient for converting a pixel value according to an output value from the epsilon filter and converting the pixel value per pixel by the calculated coefficient.

10. An image processing apparatus according to claim 9, wherein
the edge strength calculating means is configured so that the larger a primary differential value of a pixel value in a neighboring region of a pixel of interest is, the larger a value is calculated as the edge strength.

11. An image processing apparatus according to claim 9, wherein
in the threshold control means, the threshold is controlled so that the larger the edge strength is, the smaller the threshold becomes.

12. An image processing apparatus according to claim 9, wherein
in the threshold control means, the threshold is controlled so that the larger the pixel value of the input image is, the larger the threshold becomes, and the larger the edge strength is, the smaller the threshold becomes.

13. An image processing apparatus according to claim 9, wherein
the threshold control means is configured to calculate two thresholds with different values, and use a different threshold depending upon whether a value of a neighboring pixel is smaller or larger than a pixel of interest.

14. An image processing apparatus according to claim 13, wherein
the epsilon filter is configured so that in the case where the value of the neighboring pixel is larger than the value of the pixel of interest, the threshold with a larger value out of the two thresholds is used, and in the case where the value of the neighboring pixel is smaller than the value of the pixel of interest, the threshold with a smaller value is used.

15. An image processing apparatus according to claim 9, further comprising:
a nonlinear transformation means for performing nonlinear transformation on a pixel level of the input image,
wherein the epsilon filter is configured to filter the input image after the nonlinear transformation.

16. An image processing apparatus according to claim 15, wherein
the nonlinear transformation means performs logarithmic transformation on the pixel level of the input image.

* * * * *